United States Patent [19]

Weder et al.

[11] Patent Number: 5,523,046

[45] Date of Patent: * Jun. 4, 1996

[54] METHOD OF USING A FEMALE TOOL WITH MOVABLE PLATES TO FORM A SHEET OF MATERIAL INTO A FLOWER POT OR FLOWER POT COVER HAVING OUTWARD FINS

[75] Inventors: Donald E. Weder, Highland, Ill.; Franklin J. Craig, Valley Park, Mo.; Joseph G. Straeter, Highland, Ill.

[73] Assignees: The Family Trust U/T/A; Southpac Trust International, Inc., both of Oklahoma City, Okla.

[ * ] Notice: The portion of the term of this patent subsequent to Jun. 22, 2010, has been disclaimed.

[21] Appl. No.: 80,906

[22] Filed: Jun. 21, 1993

Related U.S. Application Data

[63] Continuation-in-part of Ser. No. 805,419, Dec. 10, 1991, Pat. No. 5,221,248, Ser. No. 367,098, Jun. 15, 1989, Pat. No. Des. 318,030, Ser. No. 710,272, Jun. 4, 1991, Ser. No. 411,249, Sep. 22, 1989, Pat. No. Des. 358,113, Ser. No. 411,247, Sep. 22, 1989, said Ser. No. 805,419, is a continuation-in-part of Ser. No. 422,653, Oct. 17, 1989, Pat. No. 5,073,161, which is a continuation-in-part of Ser. No. 397,114, Aug. 22, 1989, Pat. No. 5,029,412, which is a continuation-in-part of Ser. No. 366,588, Jun. 15, 1989, Pat. No. 5,111,613, which is a continuation-in-part of Ser. No. 219,083, Jul. 13, 1988, Pat. No. 4,897,031, which is a continuation-in-part of Ser. No. 4,275, Jan. 5, 1987, Pat. No. 4,773,182, which is a continuation-in-part of Ser. No. 613,080, May 22, 1984, abandoned, said Ser. No. 367,098, is a continuation-in-part of Ser. No. 283,014, Dec. 8, 1988, abandoned, which is a continuation-in-part of Ser. No. 652,903, Sep. 21, 1984, abandoned, which is a continuation-in-part of Ser. No. 613,053, May 22, 1984, Pat. No. Des. 293,224, said Ser. No. 710,272, Jun. 4, 1991, is a continuation-in-part of Ser. No. 617,454, Nov. 21, 1990, abandoned.

[51] Int. Cl.⁶ .............................................. B29C 53/04

[52] U.S. Cl. .................. 264/522; 264/320; 264/327; 264/334; 264/339; 264/553; 264/554; 156/277; 156/308.4; 425/383; 425/388; 493/133; 493/154; 493/171

[58] Field of Search ........................... 264/544, 553, 264/554, 291, 292, 295, 318, 320, 339, 334, 327; 156/227, 285, 308.2, 308.4, 309.9; 425/383, 388, 396, 369; 493/133, 154, 171

[56] References Cited

U.S. PATENT DOCUMENTS

| 3,341,893 | 9/1967 | Edwards | 264/553 |
| 4,288,401 | 9/1981 | Keith et al. | 264/554 |
| 4,480,979 | 11/1984 | Keith et al. | 264/292 |

*Primary Examiner*—Catherine Timm
*Attorney, Agent, or Firm*—Dunlap & Codding

[57] ABSTRACT

An apparatus with pivoting blades and closable surfaces for forming a sheet of material into a flower pot or flower pot cover having fins. In an embodiment for forming outwardly extending fins, the apparatus includes a male mold and a plurality of plates arranged in pairs to define a forming opening. The male mold has a plurality of fingers which are laterally extendable from the outer periphery of the male mold. A pneumatic or hydraulic piston and cylinder is provided to move the male mold between a storage position spaced from the forming opening and a forming position within the forming opening. Each pair of plates is movable between an open position and a closed position. In operation, the fingers are extended to push folded portions of a sheet of material between the pairs of plates, which are closed to press the folded portions into fins. In an alternate embodiment for forming outwardly extending fins, pairs of movable plates are positioned between stationary segments. The plates move away from one another to press folded portions of a sheet of material against the adjoining stationary segments to form fins. In another embodiment, a female mold having closable female segments cooperates with blades which are pivotable between the female segments to produce outwardly extending fins. In an apparatus for forming inwardly extending fins, blades are pivoted to push folded portions of a sheet of material between segments of a male mold.

13 Claims, 16 Drawing Sheets

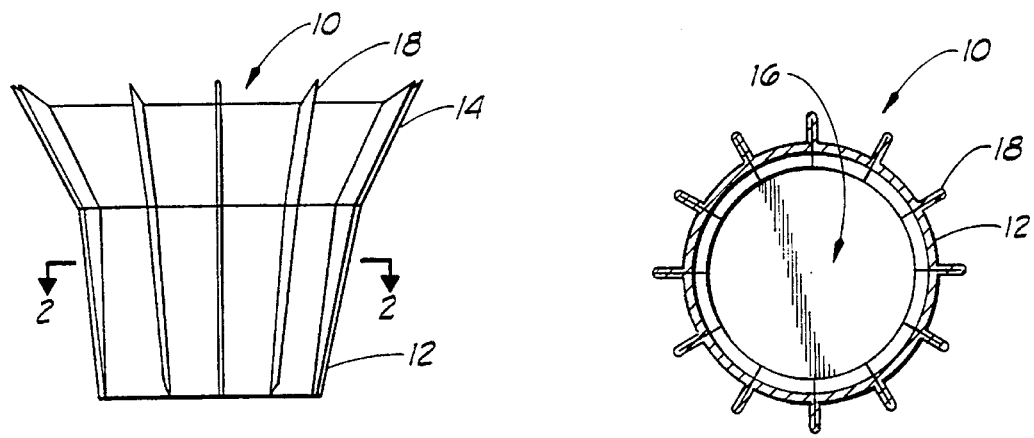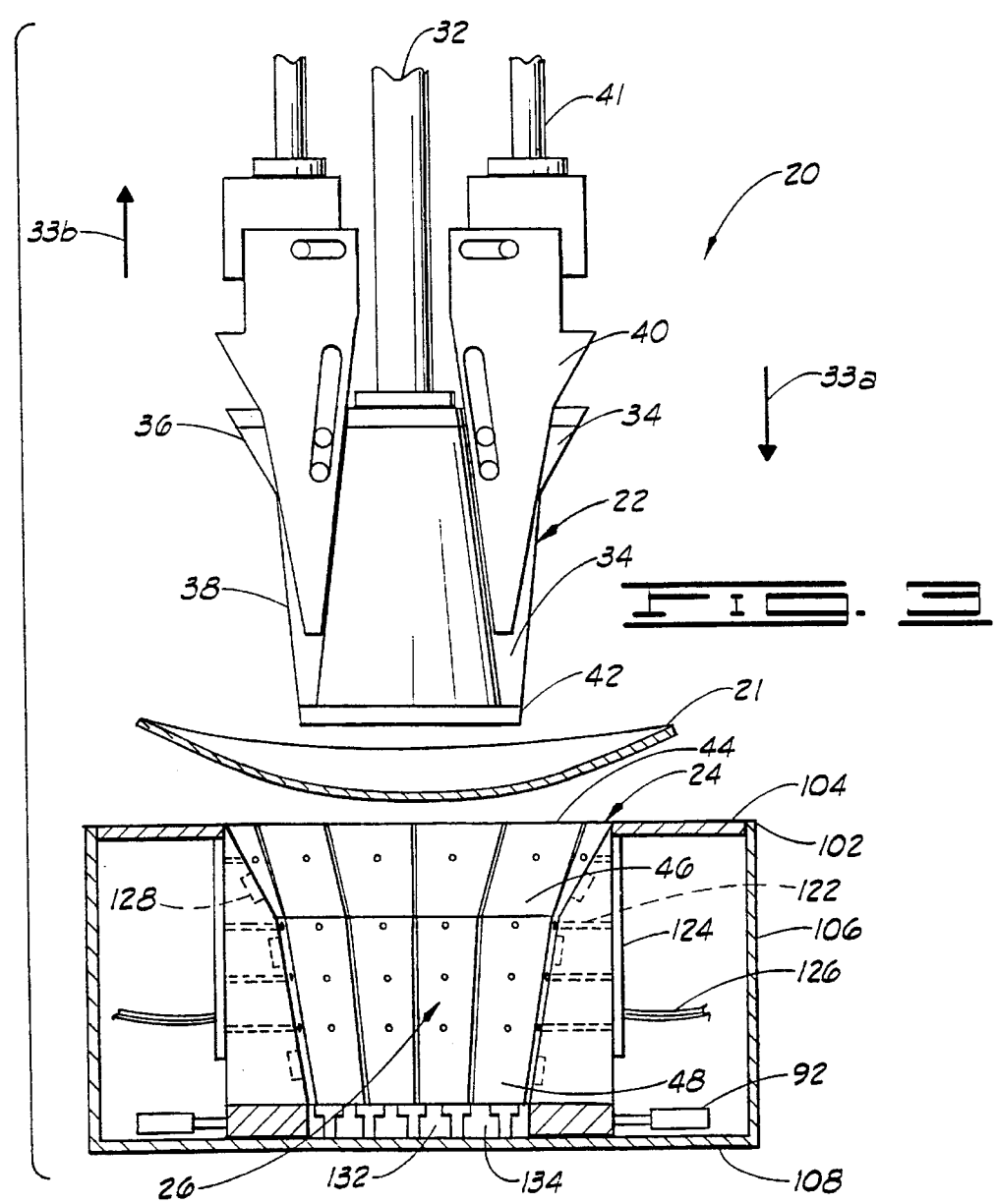

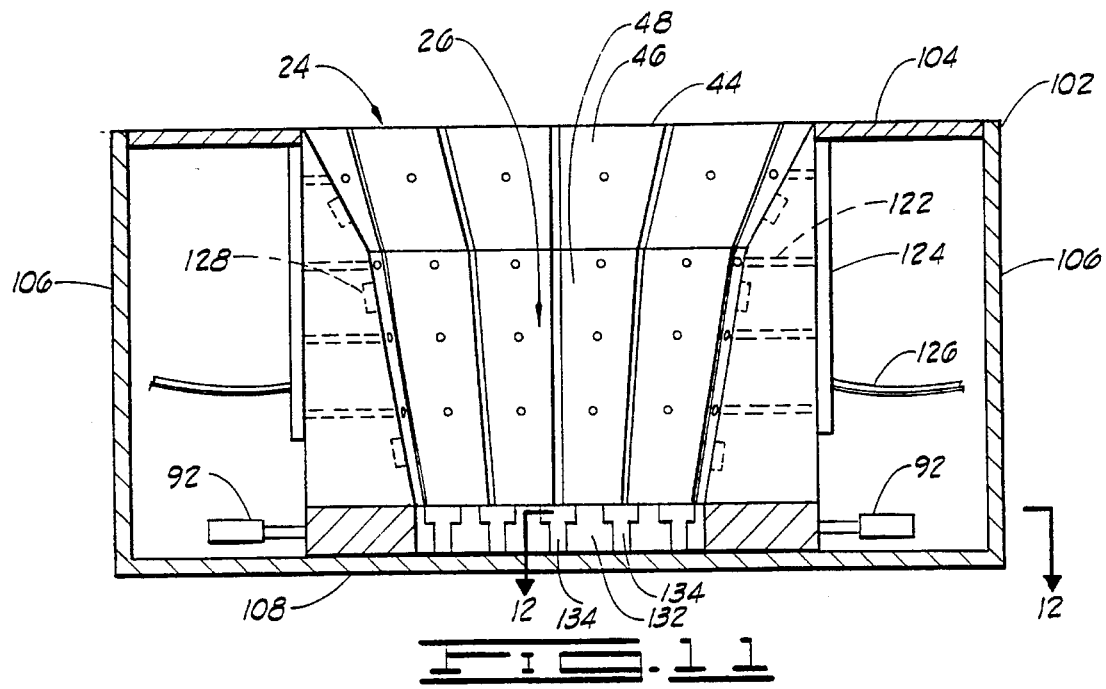
FIG. 11
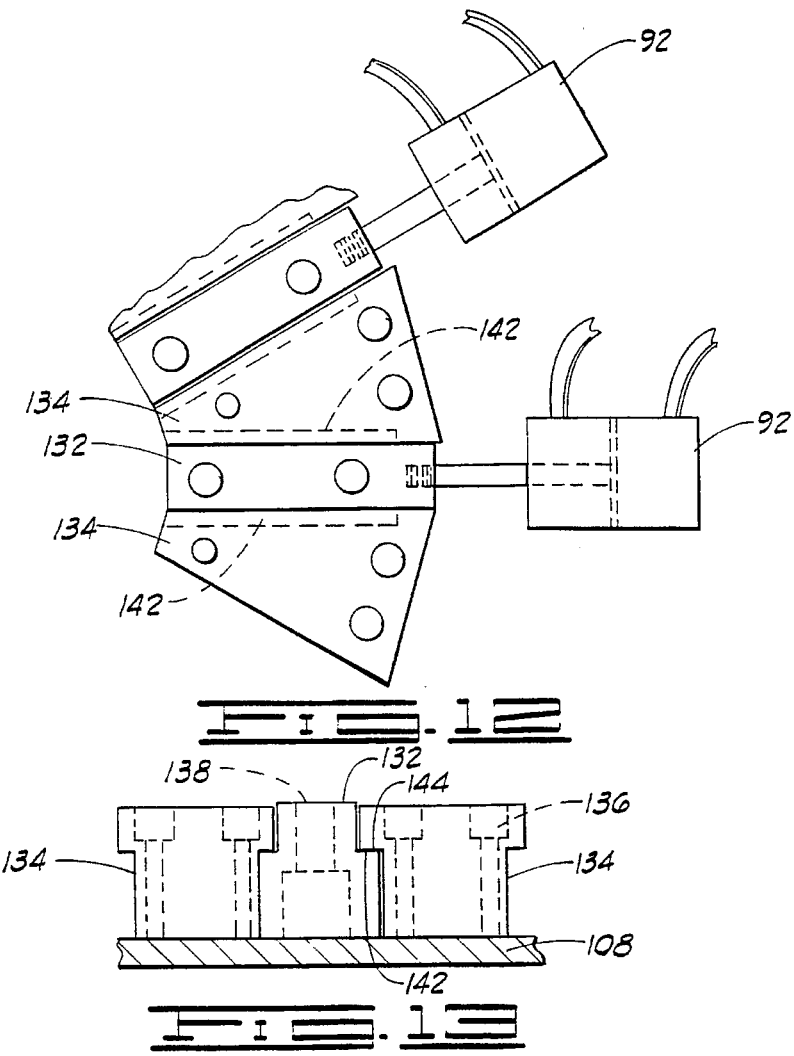
FIG. 12
FIG. 13

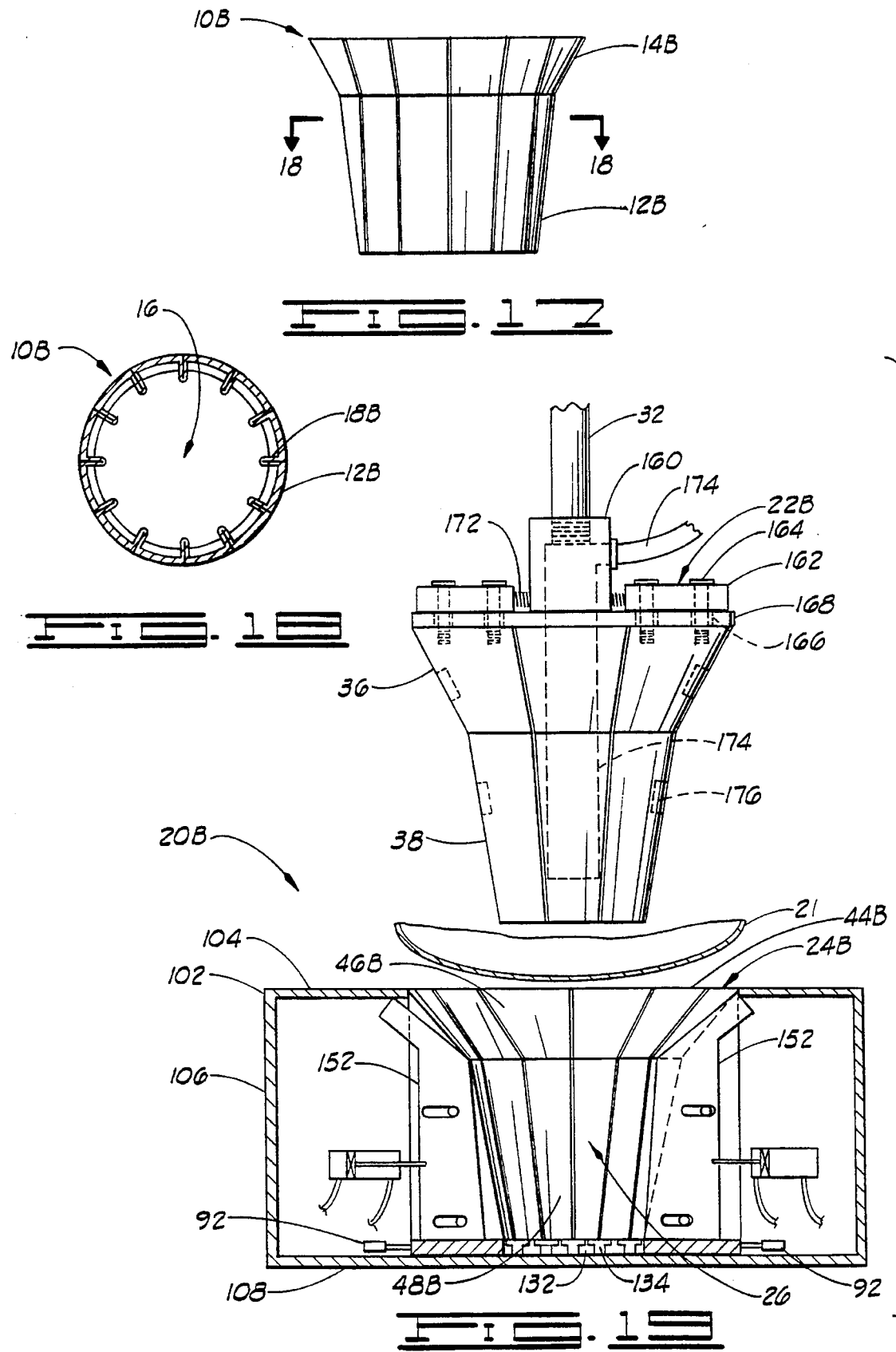

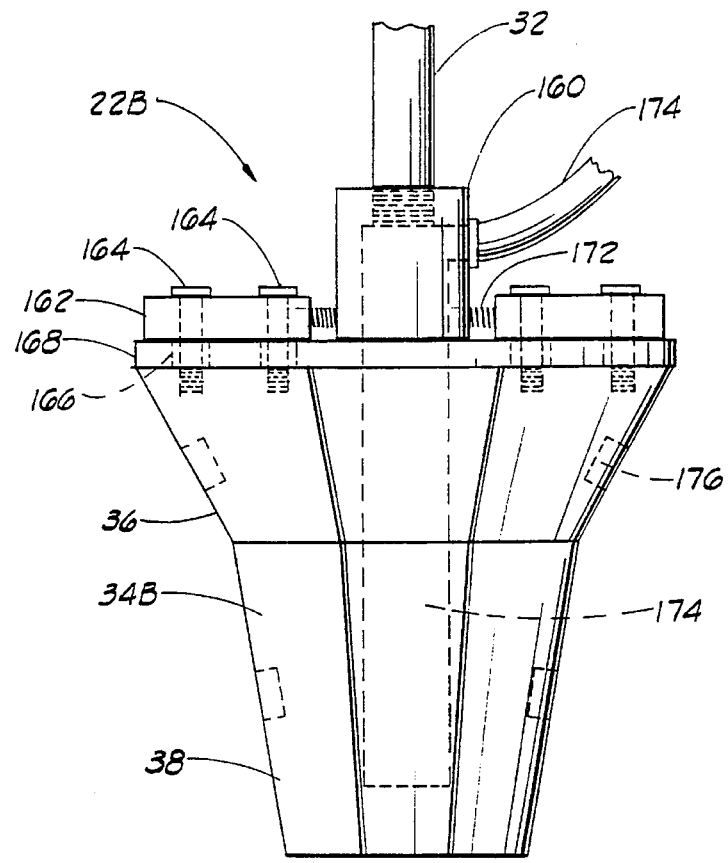
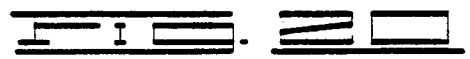
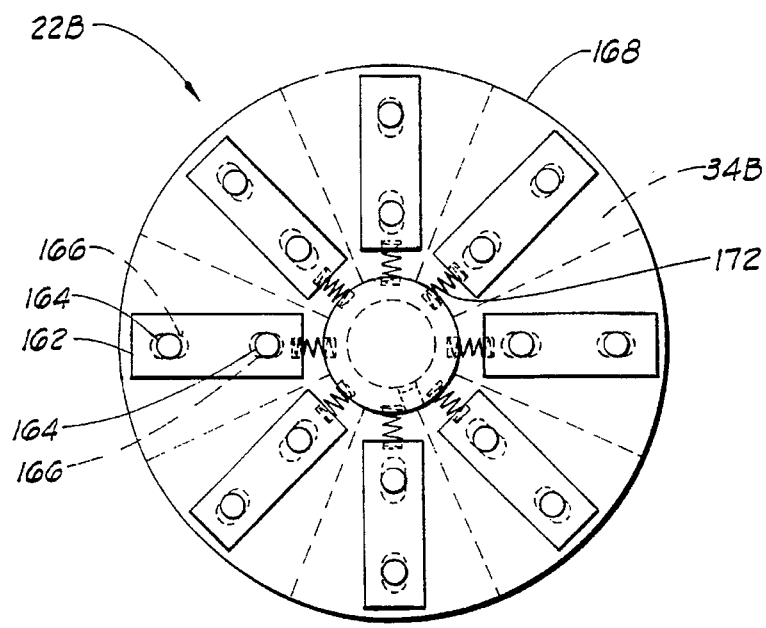

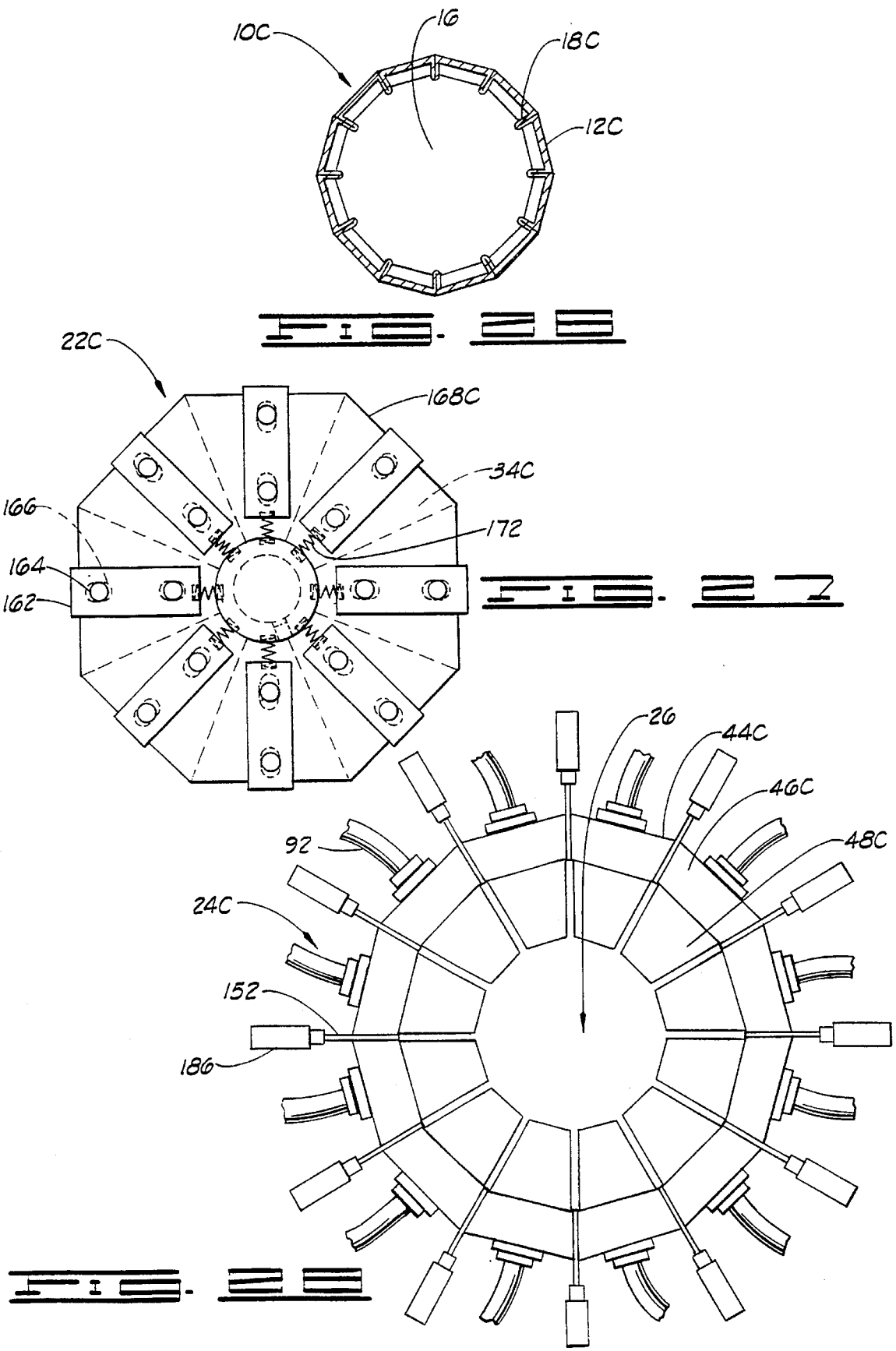

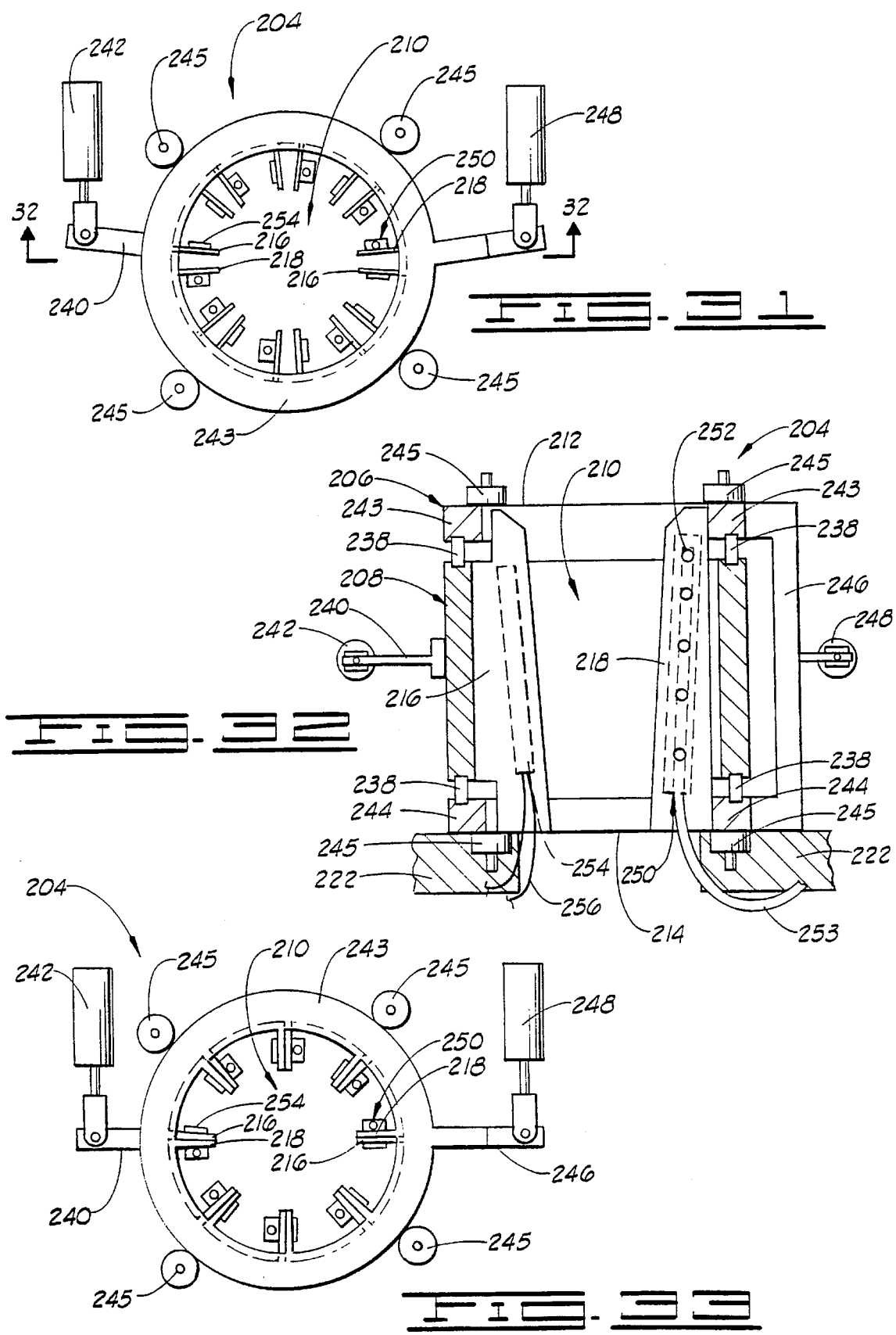

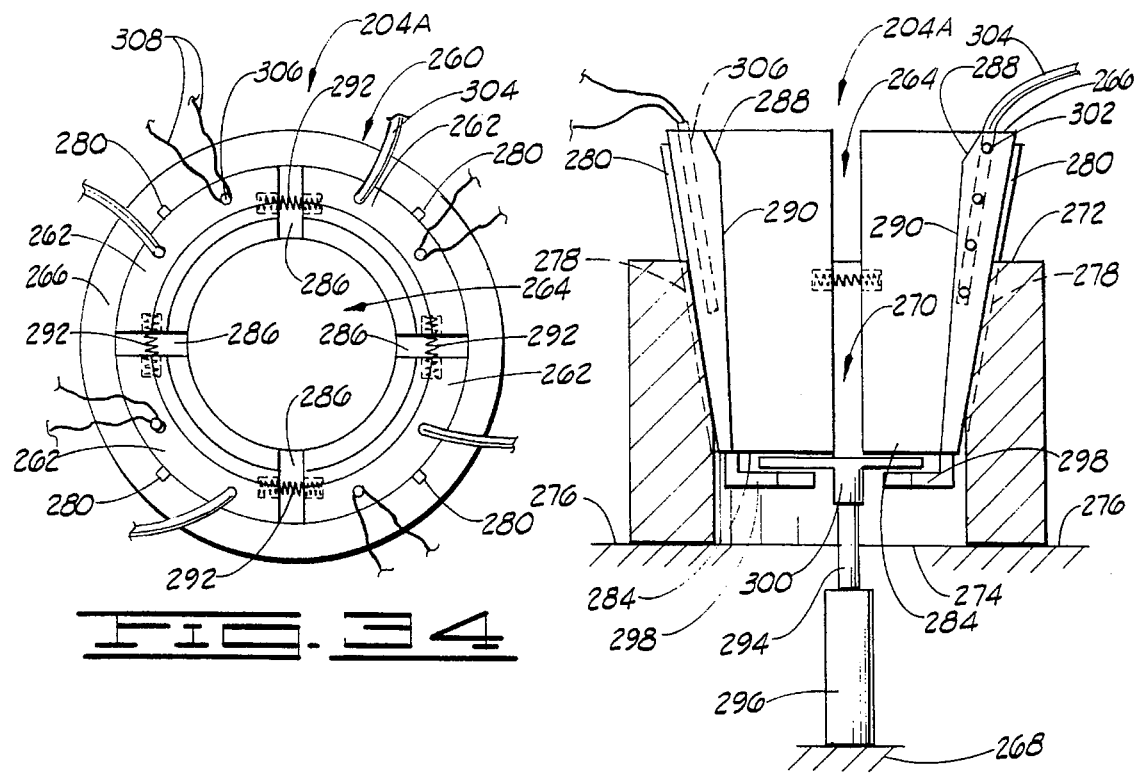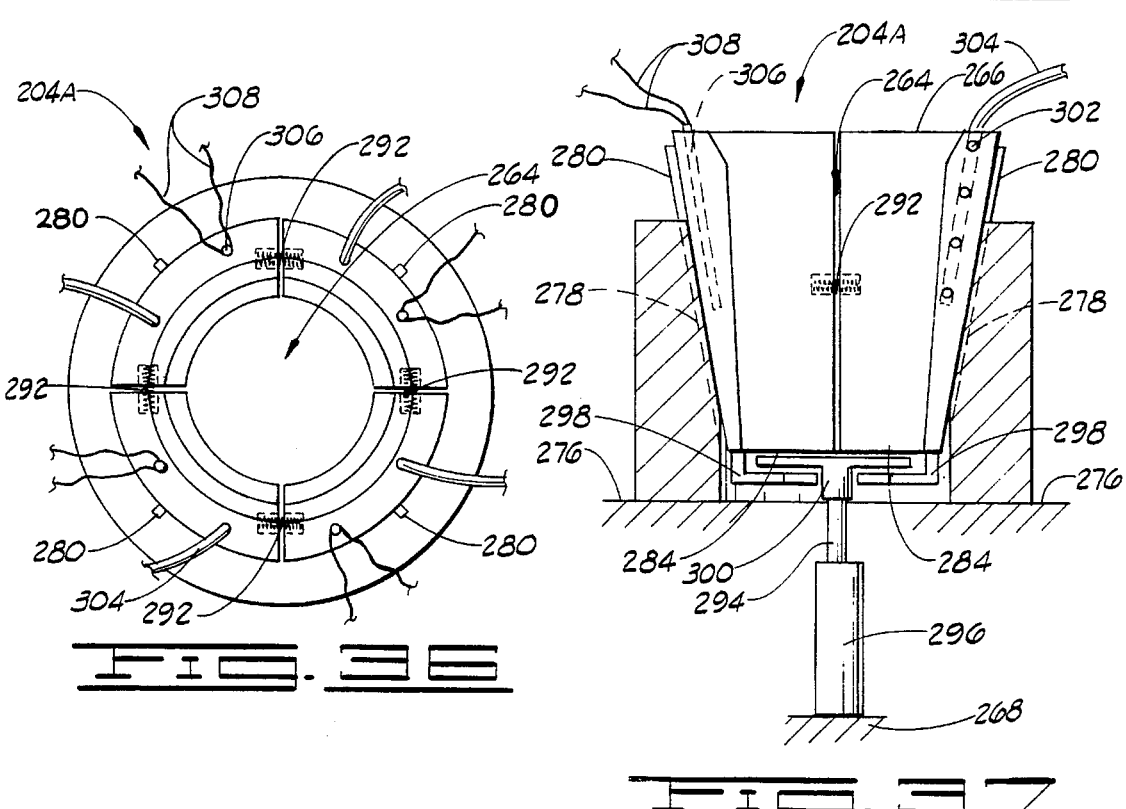

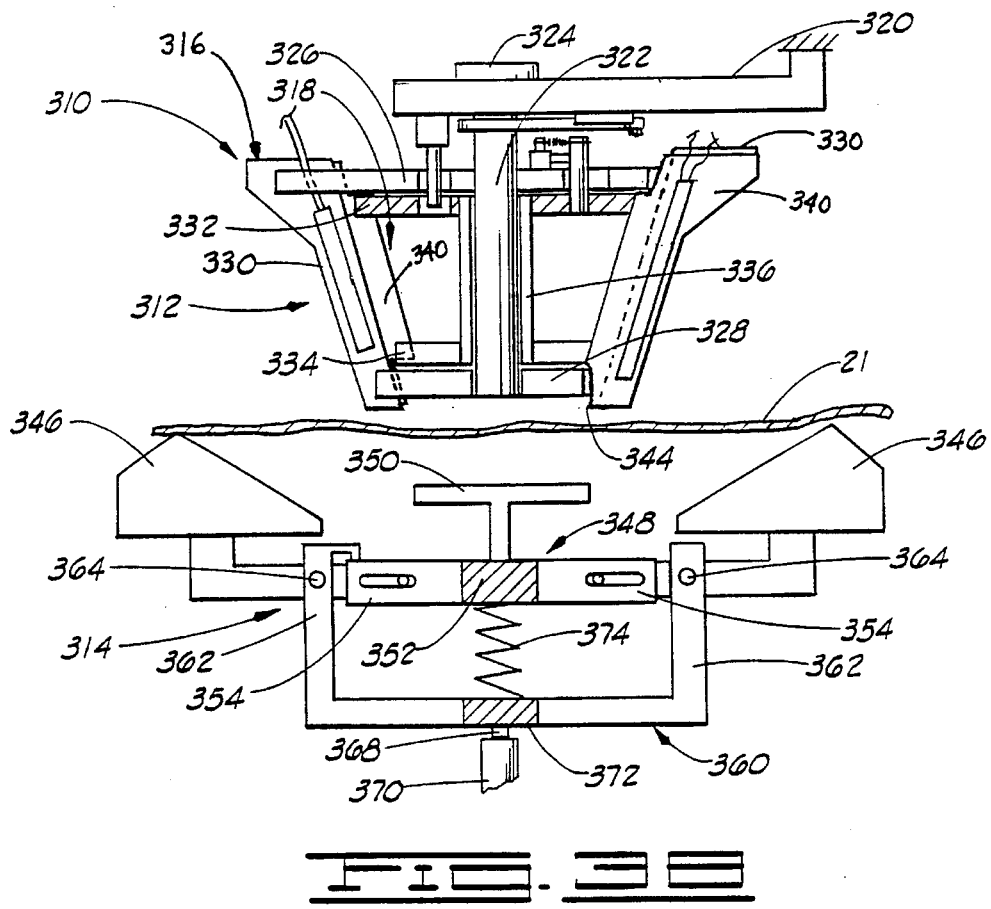
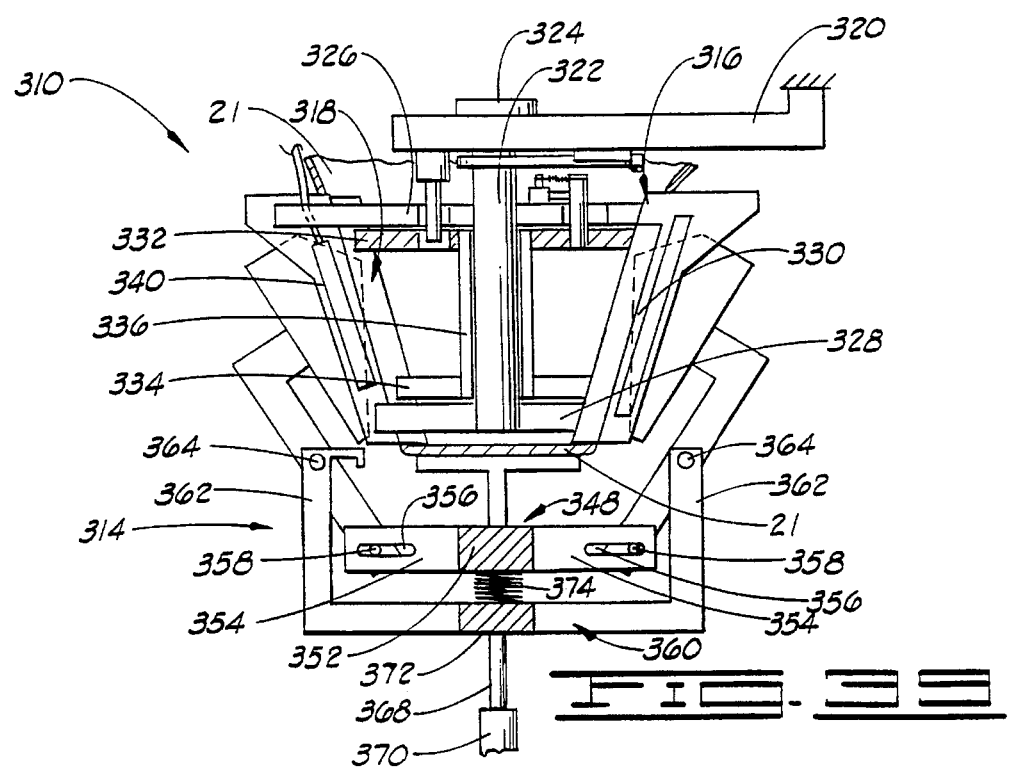

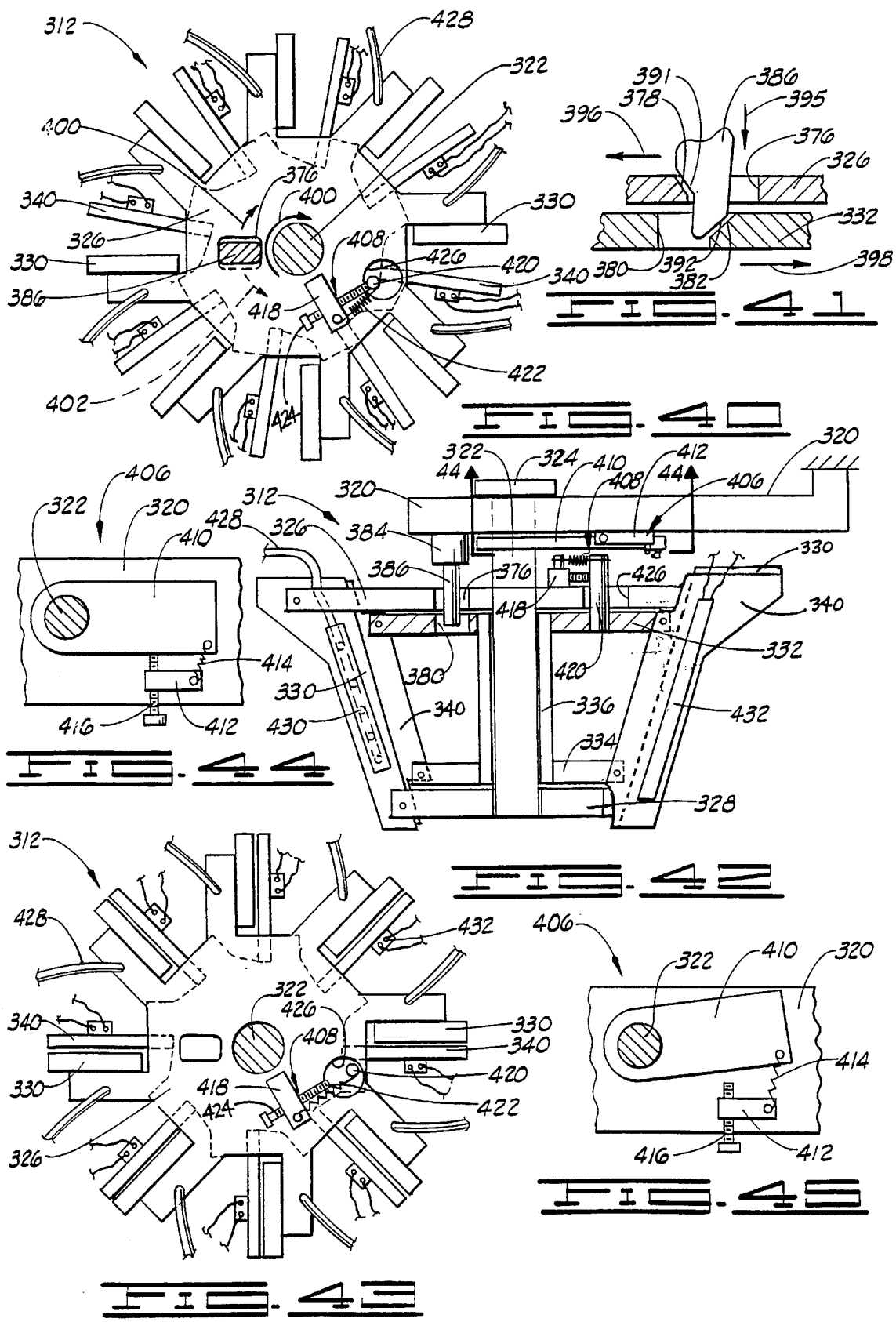

METHOD OF USING A FEMALE TOOL WITH MOVABLE PLATES TO FORM A SHEET OF MATERIAL INTO A FLOWER POT OR FLOWER POT COVER HAVING OUTWARD FINS

CROSS-REFERENCE TO RELATED APPLICATIONS

The present application is a continuation-in-part of: U.S. Ser. No. 07/805,419, filed Dec. 10, 1991, entitled "FLOWER POT OR FLOWER POT COVER WITH FINS issued as U.S. Pat. No. 5,221,248 on Jun. 22, 1993;" which is a continuation-in-part of U.S. Ser. No. 07/422,653, filed Oct. 17, 1989, issued as U.S. Pat. No. 5,073,161 entitled "FLOWER POT OR FLOWER POT COVER WITH CONTROLLED PLEATS on Dec. 17, 1991,;" which is a continuation-in-part of U.S. Ser. No. 02/397,114, filed August 22, 1989, issued as U.S. Pat. No. 5,029,412 on Jul. 9, 1991; which is a continuation-in-part of U.S. Ser. No. 07/366,588, filed Jun. 15, 1989 issued as U.S. Pat. No. 5,111,613 on May 12, 1992; which is a continuation-in-part of U.S. Ser. No. 07/219,083, filed Jul. 13, 1988, issued as U.S. Pat. No. 4,897,031 on Jan. 30, 1990; which is a continuation-in-part of U.S. Ser. No. 07/004,275, filed Jan. 5, 1987, issued as U.S. Pat. No. 4,773,182 on Sep. 27, 1988; which is a continuation of U.S. Ser. No. 06/613,080, filed May 22, 1984 now abandoned; and Which is a continuation-in-part of design application U.S. Ser. No. 07/367,098, filed Jun. 15, 1989, issued as U.S. Pat. No. D318,030 on Jul. 9, 1991; which is a continuation-in-part of U.S. Ser. No. 07/283,014, filed Dec. 8, 1988 now abandoned; which is a continuation of U.S. Ser. No. 06/652,903, filed Sep. 21, 1984, now abandoned; which is a continuation-in-part of U.S. Ser. No. 06/613,053, filed May 22, 1984, issued as U.S. Pat. No. D293,224 on Dec. 15 1987; and U.S. Ser. No. 07/710,272, filed Jun. 4, 1991, entitled "FLAT PANEL FLOWER POT COVER;" which is a continuation-in-part of U.S. Ser. No. 07/617,454, filed Nov. 21, 1990 now abandoned; and U.S. Ser. No. 07/411,249, filed Sep. 22, 1989 issued as U.S. Pat. No. D358,113 on May 9, 1995; and U.S. Ser. No. 07/411,247, filed Sep. 22, 1989; and U.S. Ser. No. 411,245, filed Sep. 22, 1989.

This application is also related to design application entitled "FLOWER POT COVER WITH FINS" filed on an even date herewith.

FIELD OF THE INVENTION

The present invention relates to a flower pot or flower pot cover having fins in the skirt or base or both skirt and base.

BRIEF DESCRIPTION OF THE DRAWINGS

FIG. 1 is a side elevation of a flower pot or flower pot cover constructed in accordance with the present invention.

FIG. 2 is a cross-sectional view taken along the lines 2—2 of FIG. 1. The thickness of the sheet of material is exaggerated for purposes of illustration.

FIG. 3 is a side elevational, partial sectional, partial diagrammatic view of an apparatus constructed in accordance with the present invention. The male mold, the sheet of material, and the female mold are in sectional views for better illustration. The thickness of the sheet of material is exaggerated for purposes of illustration.

FIG. 11 is a vertical, partially sectional and partially diagrammatical view of the female mold of FIG. 3.

FIG. 12 is a partial cross-sectional view taken along lines 12—12 of FIG. 11.

FIG. 13 is a partial elevational view of the stationary and traveling blocks of FIG. 12 from the inside of the female mold.

FIG. 17 is a side elevation of another form of flower pot or flower pot cover constructed in accordance with the present invention.

FIG. 18 a cross-sectional view taken along lines 18—18 of FIG. 17. The thickness of the sheet of material is exaggerated for purposes of illustration.

FIG. 19 is a vertical view, partially sectional and partially diagrammatical, of an apparatus constructed in accordance with the present invention for forming the flower pot or flower pot cover of FIG. 17 from a sheet of material. The thickness of the sheet of material is exaggerated for purposes of illustration.

FIG. 20 is a side elevation of the male mold of FIG. 19.

FIG. 21 is a top plan view of the male mold of FIG. 19.

FIG. 26 is the same view as the view in FIG. 18 of another form of flower pot or flower pot cover constructed in accordance with the present invention.

FIG. 27 is a top plan view of another form of male mold constructed in accordance with the present invention.

FIG. 28 is a top plan view of another form of female mold constructed in accordance with the present invention.

FIG. 31 is a top plan view of one embodiment of the female tool of FIG. 29. The plates of the female tool are shown in an open position.

FIG. 32 is a partly diagrammatical, partly sectional side view of the female tool of FIG. 31.

FIG. 33 is the same view as FIG. 31, but with the plates of the female tool in a closed position.

FIG. 34 is a top plan view of another embodiment of the female tool of FIG. 31. The plates of the female tool are shown in an open position.

FIG. 35 is a partly diagrammatical, partly sectional side view of the female tool of FIG. 34.

FIG. 36 is the same view as FIG. 34, but with the plates of the female tool in a closed position.

FIG. 37 is the same view as FIG. 35, but with the plates of the female tool in a closed position.

FIG. 38 is a partly diagrammatical side view of an apparatus constructed in accordance with the present invention having a plurality of blades and a male tool with a plurality of plates for forming inwardly extending fins in a sheet of material. The blades are shown in a storage position.

FIG. 39 is the same view as FIG. 38, but with the blades in a forming position.

FIG. 40 is a top plan view of the male tool of FIG. 38. The plates of the male tool are shown in an open position.

FIG. 41 is a partly diagrammatical, partly sectional view of the cam for moving the plates of the male tool of FIG. 40.

FIG. 42 is a partly diagrammatical, partly sectional view of the male tool of FIG. 40.

FIG. 43 is the same view as FIG. 40, but with the plates of the male tool in a closed position.

FIG. 44 is a plan view of the first stop assembly of the male tool of FIG. 42. The first stop assembly is shown in the biased position.

FIG. 45 is the same view as FIG. 44, but with the first stop assembly rotated by the cam.

DETAILED DESCRIPTION OF THE PREFERRED EMBODIMENTS

Figure 4:
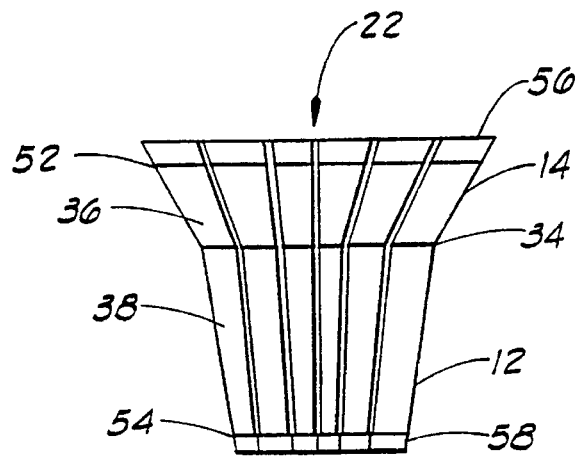
FIG. 4 is a side elevation of the male mold of FIG. 3, excluding the male mold fingers and the pneumatic cylinders.

Referring now to the drawings in general, and to FIGS. 1 and 2 in particular, reference numeral 10 indicates a flower pot or flower pot cover with outwardly extending fins. For simplicity, the term "flower pot cover" is used hereinafter to mean a "flower pot" as well as a "flower pot cover." It will be appreciated that a flower pot has an opening for the insertion of floral and decorative objects and a flower pot cover has an opening for the insertion of a flower pot containing floral and decorative objects.

The flower pot cover 10 has a base 12, which is generally frusto-conical in shape, and a skirt 14 extending angularly upward from the base 12. An opening 16 is formed in the flower pot cover 10 for the insertion of a flower pot with decorative and floral arrangements. A plurality of fins extend outwardly from the outer perimeter of the base 12 and the skirt 14 of the flower pot 10. One of the fins, designated by reference numeral 18, is generally representative of the fins formed in the flower pot cover 10.

FIG. 3 illustrates an apparatus 20 constructed in accordance with the present invention for forming the flower pot cover 10 with outwardly extending fins 18 from a sheet of material 21. It will be appreciated that the thickness of the sheet of material 21 is exaggerated in FIG. 3 for purposes of illustration. The apparatus 20 comprises a male mold 22 and a female mold 24, the female mold 24 having an opening 26 mating with the male mold 22. The male mold 22 includes a pneumatic cylinder 32 or other mechanism for movement of the male mold 22. The pneumatic cylinder 32 is adapted and positioned to move the male mold 22 in a downward direction 33a into a forming position within the female mold 24 and in an upward direction 33b to a storage position at a distance from the female mold 24. The hydraulic cylinder 32 is connected to a support assembly (not shown) and the hydraulic cylinder 32 and the support assembly cooperate to support the male mold 22 at a distance from the female mold 24 in the storage position of the male mold 22.

The male mold 22 comprises of a plurality of male segments. One of the male segments, designated by reference number 34, is generally representative of the male segments forming the male mold 22. Each male segment 34 has a skirt forming surface 36 and a base forming surface 38. The outer periphery of the male skirt forming surfaces 36 and the male base forming surfaces 38 comprise a male forming surface of the male mold 22.

Between each pair of adjacent male segments 34 extends a male finger. One of the fingers, designated by reference number 40, is generally representative of the of fingers of the male mold 22. Each of the male fingers 40 is connected to a pneumatic cylinder 41 for extending the attached male finger 40 to the bottom 42 of the male mold 22 and for retracting the attached male finger 40 to a position where the finger 40 does not protrude radially from the outer periphery of the male segments 34.

The sheet of material 21 has a relatively small thickness, preferably less than about 3 mils. However, depending upon the type of materials selected and the desired effect in the formed flower pot cover 10, the sheet of material may have a thickness in a range from less than about 1.5 mils to about 30 mils. The sheet of material is constructed of a material selected from the group of materials consisting of cellophane, man-made organic polymer films, metallic foil, burlap, fabric or paper or combinations thereof.

The term "man-made organic polymer film" means a man-made resin such as a polypropylene as opposed to naturally occurring resins such as cellophane.

A man-made organic polymer film is relatively strong and not as subject to tearing (substantially non-tearable), as might be the case with paper or foil. The man-made organic polymer film is a substantially linearly linked processed organic polymer film and is a synthetic linear chain organic polymer where the carbon atoms are substantially linearly linked. Such films are synthetic polymers formed or synthesized from monomers. Further, a relatively substantially linearly linked processed organic polymer film is virtually waterproof, a characteristic which may be desirable in many applications such as holding a floral grouping.

Additionally a relatively thin film of substantially linearly linked processed organic polymer does not substantially deteriorate in sunlight. Processed organic polymer films having carbon atoms both linearly linked and cross linked polymer films also may be suitable for use in the present invention, provided such films are substantially flexible and can be made in a sheet-like format for wrapping purposes consistent with the present invention. For example, one man-made organic polymer film is polypropylene film.

In order for the flower pot cover 10 to be shape-sustaining, the sheet of material 21 may be treated to be self-adhering or heat-sealant. A self-adhering material sets folds upon contact with itself and the pressure exerted by the male mold 22 and female mold 24 in the forming process. Application of heat to a heat-sealant material causes folds in the material to be sustained after the forming process.

As shown in FIG. 3, the female mold 24 comprises a plurality of female segments. One of the female segments, designated by reference number 44, is generally representative of the female segments of the female mold 24. The surfaces of the female segments 44 which form the opening 26 of the female mold 24 comprise a female molding surface. The female molding surface is made up of female skirt surfaces and female base surfaces. One of the female skirt surfaces, designated by reference character 46, is generally representative of the plurality of female skirt surfaces. One of the female base surfaces, designated by reference character 48, is generally representative of the plurality of female base surfaces. The female forming surfaces 46 and 48 are sized and shaped to mate with the male forming surfaces of the male mold 22.

Figure 5:
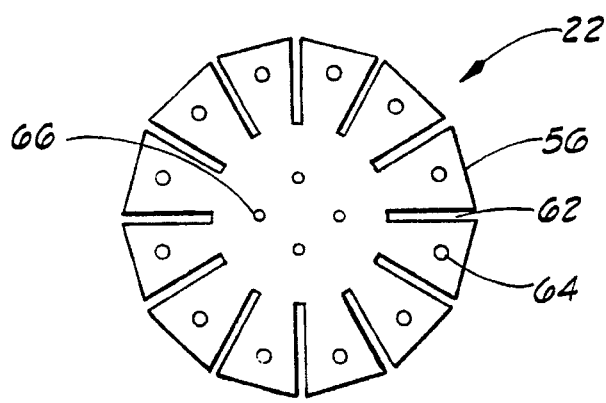
FIG. 5 is a top plan view of the male mold of FIG. 4.
Figure 6:
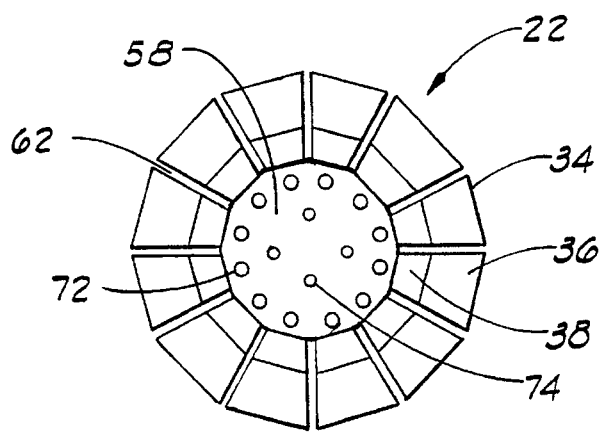
FIG. 6 is a bottom plan view of the male mold of FIG. 4.

The male mold 22 is shown separately, without the fingers 36, in FIGS. 4, 5 and 6. The male mold 22 is sectioned into the male mold segments 34. Each male mold segment 34 is separated from adjacent male mold segments 34 by a space extending from the top 52 to the bottom 54 of each male mold segment 34. The male mold segments 34 are connected together by a top plate 56 and a bottom plate 58. The top 56 and bottom 58 plates are attached to the male mold segments by bolts or other fasteners.

FIG. 5 illustrates the top plate 56 of the male mold 22. The top plate 56 has a multi-sided shape, with a plurality of slots extending from the outer periphery of the plate 56 toward the center of the plate 56. One of the slots is designated by reference numeral 62 and is generally representative of the slots in the plate 56. The slots 62 align with the spaces between the male mold segments 34 and are sized and shaped to allow the fingers 40 to pass therethrough.

Each area of the top plate 56 between the slots 62 has at least one hole 64 for inserting a bolt or other fastener to connect the top plate 56 to the top end 52 of one of the male mold segments 34. A plurality of holes is formed in the inner portion of the top plate 56. One of the inner holes is designated by reference numeral 66 and is generally representative of the inner holes in the top plate 56. The inner holes 66 are used for the attachment of the pneumatic cylinder 32 and for attachment of the top plate 56 to the bottom plate 58 through the center of the male mold 22.

FIG. 6 shows the bottom plate 58 attached to the bottom 54 of the male mold segments 34. Like the top plate 56, the bottom plate 58 is multi-sided. The bottom plate 58, however, has no slots for the passage of the fingers 40. At least one hole extends through an outer portion of the bottom plate 58 into each male mold segment 34 for attaching each male mold segment 34 to the bottom plate 58 by means of a bolt or other fastener. One of the outer holes is designated by reference numeral 72 and is generally representative of the outer holes of the bottom plate 58. A plurality of holes are formed through an inner portion of the bottom plate 58. One of the inner holes is designated by reference numeral 74 and generally represents the inner holes of the bottom plate 58. The inner holes 74 are used to attach the bottom plate 58 to the upper plate 56 through the center of the male mold 22 with bolts or other fasteners.

Figure 7:
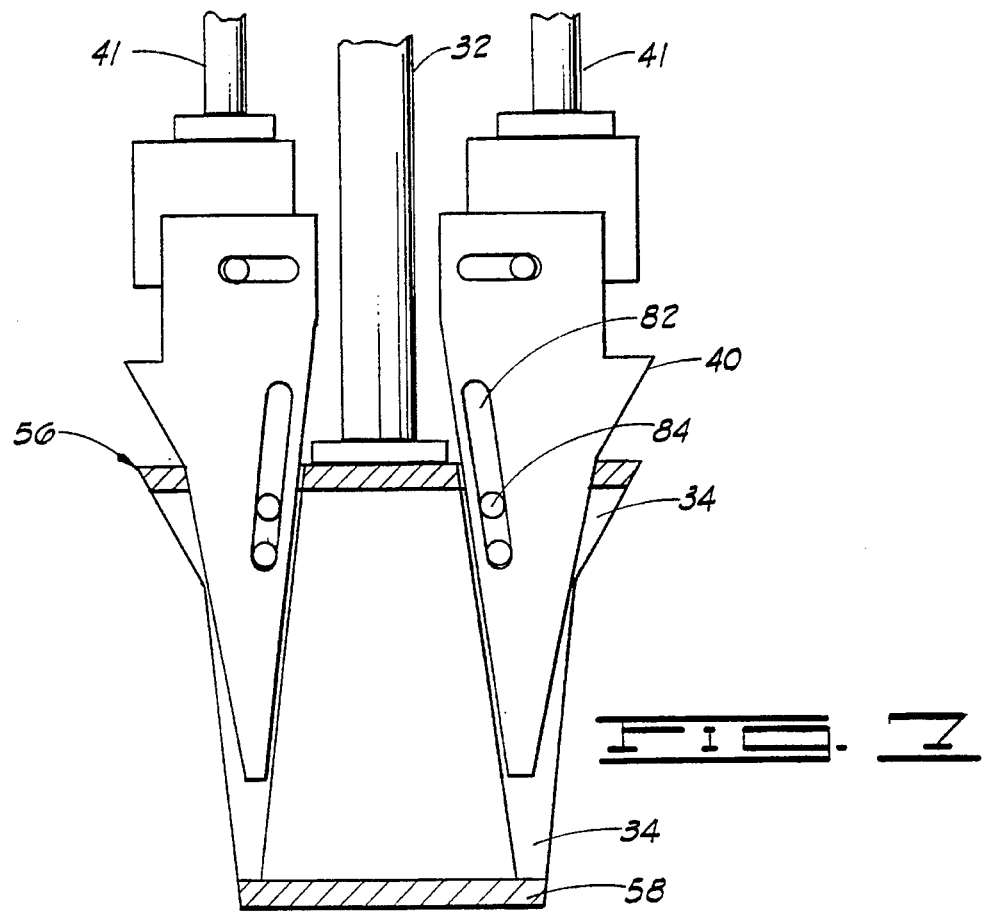
FIG. 7 is a vertical cross-sectional view of the male mold of FIG. 3 with the male mold fingers in the retracted position.
Figure 8:
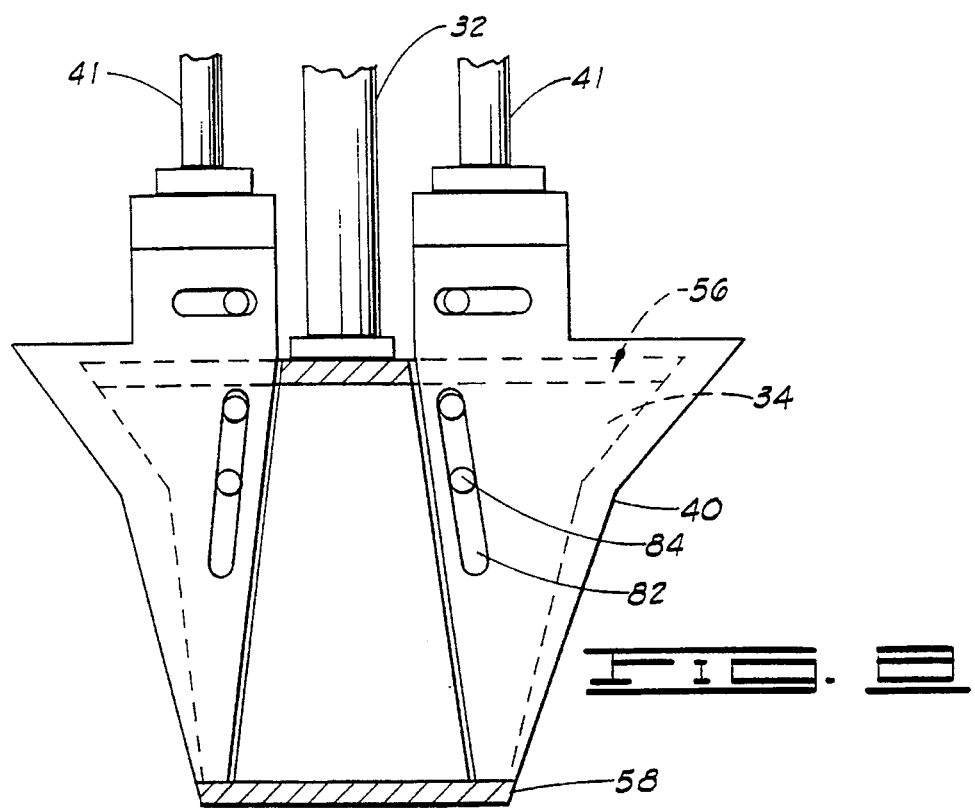
FIG. 8 is a vertical cross-sectional view of the male mold of FIG. 3 with the male mold fingers in the extended position.

FIGS. 7 and 8 illustrate the fingers 40 of the male mold 22. One of the fingers 40 of the male mold 22 is mounted in each vertical space between adjacent male mold segments 34 by means of a guide slot 82 in the finger 36 and at least one pin 84 extending horizontally between the adjacent male mold segments 34 and through the guide slot 82. The pneumatic cylinder 41 attached to the upper end of each finger 40 moves the finger 40 between a retracted position shown in FIG. 7 and an extended position shown in FIG. 8. In the retracted position of FIG. 7, each finger 40 is a distance above the bottom plate 58 and does not protrude from the outer periphery of the male mold segments 34. In the extended position of FIG. 8, each finger 40 extends through one of the slots 62 of the upper plate 56 and one of the vertical spaces between the male mold segments 34. When the fingers 40 are extended as illustrated by FIG. 8, each finger 40 reaches the bottom plate 58 and a portion of each finger 40 extends radially outward from the outer periphery of the male mold segments 34.

Figure 9:
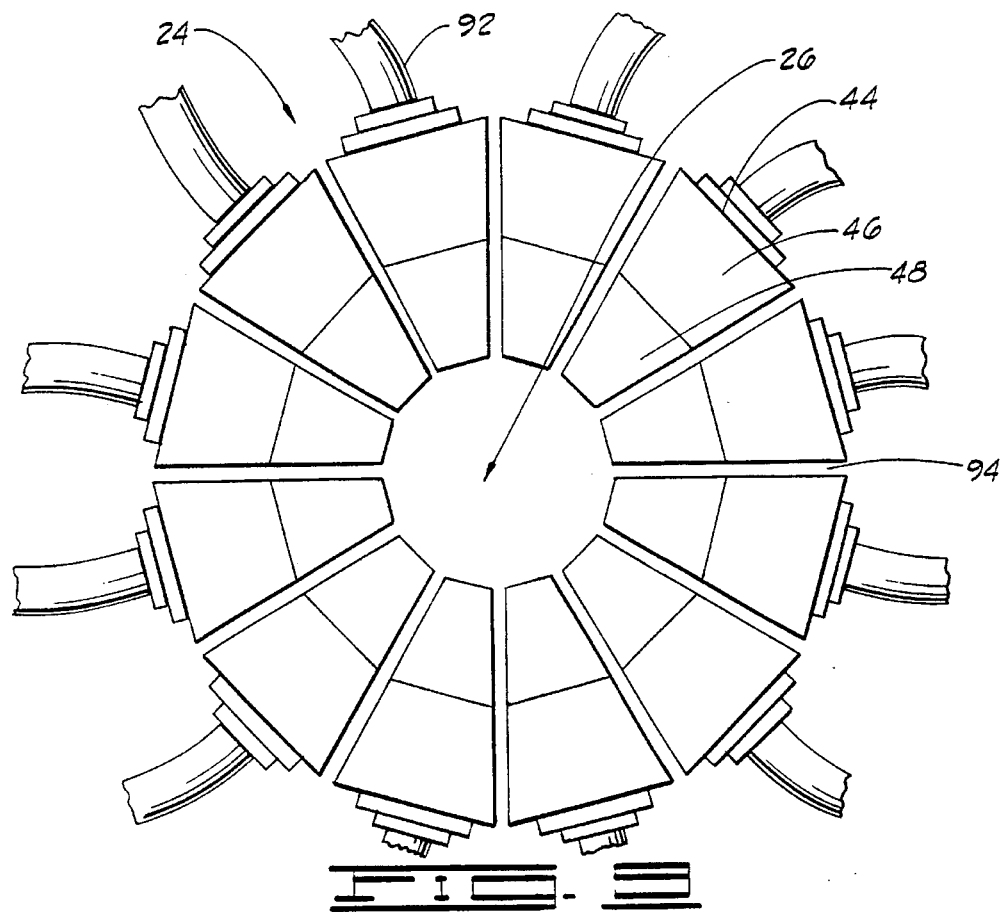
FIG. 9 is a top plan view of the female mold of FIG. 3 with the female segments in the open position.
Figure 10:
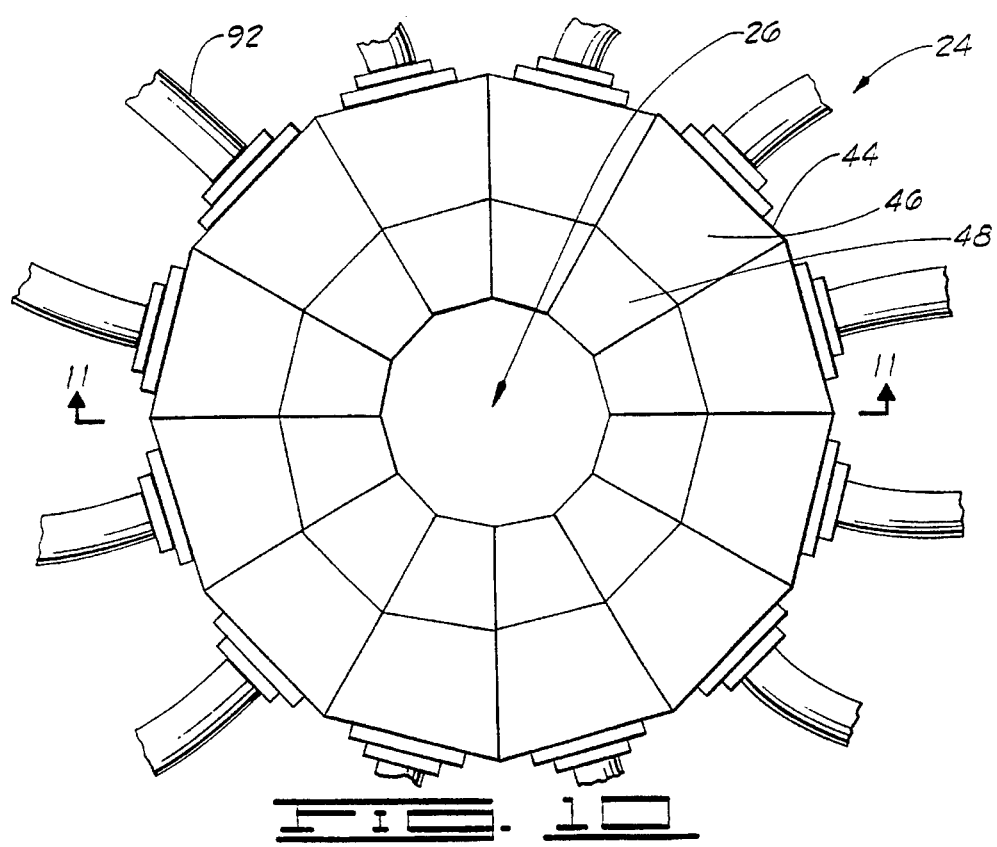
FIG. 10 is a top plan view of the female mold of FIG. 3 with the female segments in the closed position.

FIGS. 9 and 10 illustrate the construction of the female mold segments 44. The female mold segments 44 are arranged to form the multi-sided opening 26. As described hereinabove, each female mold segment 44 comprises the female skirt forming surfaces 46 and the female base forming surfaces 48. Together, the female skirt forming surfaces 46 and the female base forming surfaces 48 make up the female forming surfaces.

As shown in FIGS. 9 and 10, a pneumatic cylinder is attached to each female mold segment 44. One of the pneumatic cylinders is designated by reference numeral 92 and is generally representative of the pneumatic cylinders of the female mold 24. Each pneumatic cylinder 92 is adapted to move the attached female mold segment 44 between an open position shown in FIG. 9 and a closed position shown in FIG. 10. In the open position of FIG. 9, the female mold segments 44 are separated by spaces. One of the spaces is designated by reference numeral 94 and is generally representative of the spaces between the female mold segments 44 when in the open position. In the closed position of FIG. 10, the female mold segments 44 are moved inward by the pneumatic cylinders 92 and the female mold segments 44 press against each other.

FIG. 11 illustrates the female mold 24 installed in a platform 102. The platform 102 comprises an upper work surface 104 supported by a plurality of sides 106 and a bottom 108. The upper work surface 104 is a flat, level area surrounding the upper end of the female mold 24. The upper surface 104 is supported by the sides 106 and the bottom 108 of the platform 102.

A plurality of vacuum lines extend from the outer periphery of each female mold segment 44 to the surface of the female opening 26. One of the vacuum lines is designated by reference numeral 122 and is generally representative of the vacuum lines of the female mold 24. Each vacuum line 122 opens at the surface of the female opening 26 and is connected to common duct 124 and vacuum supply hose 126. A vacuum source (not shown) provides an air suction through the hoses 126, the ducts 124 and the lines 122 to create a vacuum at the surface of the female opening 26.

A plurality of cartridge type heating elements may be connected to the female segments 44. One of the heating elements is designated by reference number 128 and is generally representative of the heating elements of the female mold 24. The heating elements 128 are positioned about the female segments and connected to an electrical power supply (not shown) for heating the female forming surface to a predetermined temperature level for forming the flower pot cover 10. The sheet of material 21 may be a heat-sealable substance in order for the heat to give the shape of the flower pot cover 10 added permanence.

Continuing to refer to FIG. 11, the bottom of each female mold segment 44 is attached to a corresponding traveling block 132 and slides on a portion of two stationary blocks 134 positioned on each side of the traveling block 132. One of the pneumatic cylinders 92 is connected to each traveling block 132 and moves the traveling block 132 and the attached female mold segment 44 between the open position and the closed position. FIG. 12 shows the attachment of the pneumatic cylinder 92 to the traveling block 132.

The traveling blocks 132, stationary blocks 134 and female mold 24 are supported by the bottom 108 of the platform 102. As best shown in FIG. 13, a plurality bolts or fasteners 136 extend downward through each stationary block 134 and into the platform bottom 108 to secure each stationary block 134. Each bolt 136 is countersunk to make the upper surface of each stationary block a smooth area on which the female segments 44 can slide. A plurality of bolts or fasteners 138 extend upward through each traveling block 132 and into one of the female mold segments 44. Each bolt 138 is countersunk to make the bottom surface of each traveling block smooth for sliding on the bottom 108 of the platform 102. Each side of each traveling block 132 has an L-shaped shoulder 142 which mates with an L-shaped shoulder 144 of the adjacent stationary block 134. With this construction of the stationary blocks 134 and traveling blocks 132, the stationary blocks 134 define a path of travel for the traveling blocks 132 and restrict the traveling blocks 132 to the travel path.

In operation, the male mold 22 is moved to the storage position with the fingers 40 retracted. The female segments 44 of the female mold 24 are moved to the open position with the vacuum off. The sheet of material 21 is then placed over the opening 26 of the female mold 24.

The male mold 22 is moved into the opening 26 of the female mold 24 with the sheet of material 21 between the male mold 22 and the female mold 24. In the forming position, each male base forming surface 38 aligns with one of the female base forming surfaces 48 and each male skirt forming surface 36 aligns with one the female skirt forming surfaces 46. Before the male forming surfaces press the sheet of material against the female forming surfaces, the fingers 40 of the male mold 22 are extended to push folds in the sheet of material 21 between the open female segments 44. The vacuum of the female mold 24 is then activated to hold the folds and sheet of material 21 in place during the forming process. Once the vacuum is effectively holding the sheet of material 21, the fingers 40 of the male mold 22 are retracted, leaving the folds in the sheet of material 21 in the spaces between the female segments 44.

At this time, the female segments 44 are closed on the folds in the sheet of material 21 to form outwardly extending fins in the sheet of material 21. At the same time, the male mold 22 is moved fully into the female opening 26, pressing the sheet of the material 21 between the male forming surfaces and the female forming surfaces to form the sheet of material 21 into the shape of the flower pot cover 10. If the sheet of material 21 is a heat-sealable substance, the heat from the cartridge heating elements 128 of the female mold 24 heat-seals the sheet of material 21 into the shape of the flower pot cover 10 with outwardly extending fins.

After the forming process, the male mold 22 is returned the storage position at a distance from the female mold 24. The vacuum of the female mold 24 is turned off and the female segments 44 are moved to the open position. The completed flower pot cover 10 with outwardly extending fins is removed from the opening 26 of the female mold 24, and the process begins anew with another sheet of material 21.

Figure 14:
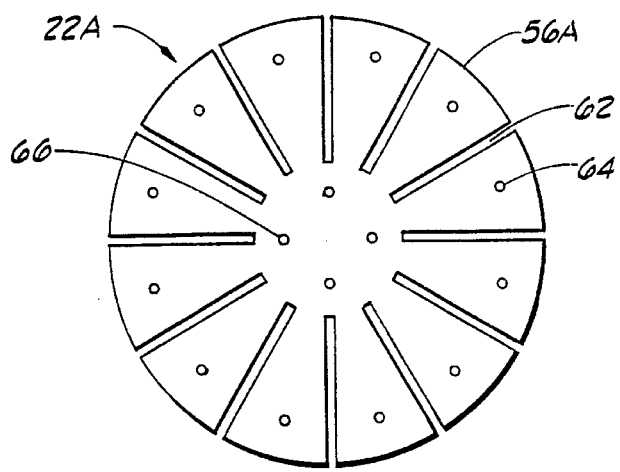
FIG. 14 is a top plan view of another form of male mold excluding the male mold fingers and pneumatic cylinders and constructed in accordance with the present invention.
Figure 15:
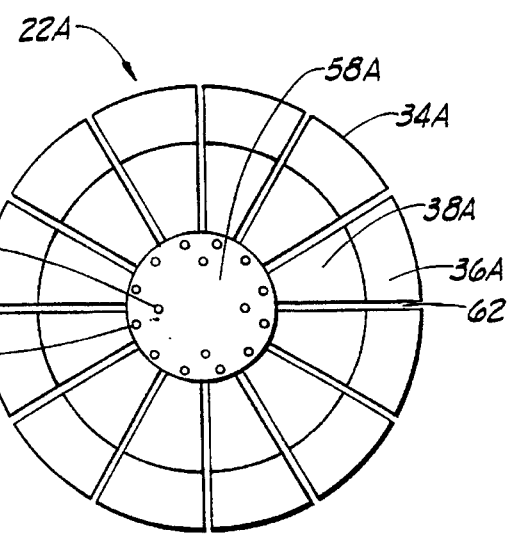
FIG. 15 is a bottom plan view of the male mold of FIG. 14.
Figure 16:
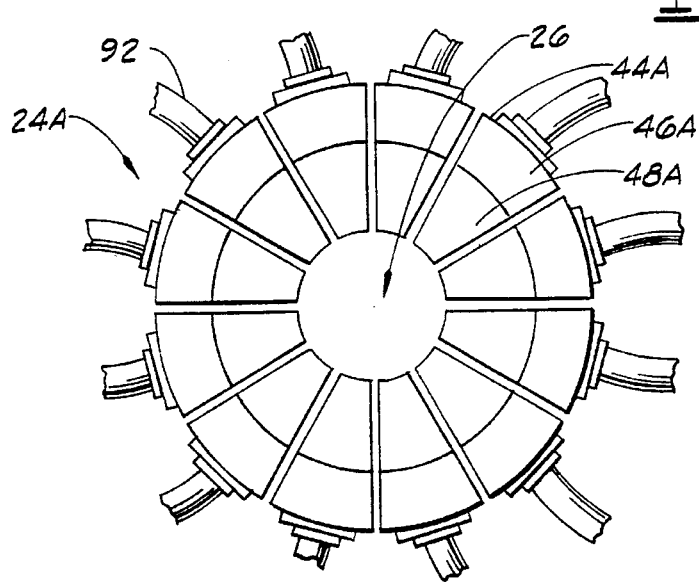
FIG. 16 is a top plan view of another form of female mold constructed in accordance with the present invention.

FIGS. 14, 15 and 16 illustrate another form of male mold 22A and female mold 24A constructed in accordance with the present invention. As FIG. 14 shows, the male mold 22A and the top plate 56A have an outer periphery which is circular rather than multi-sided. As best illustrated by FIG. 15, the male skirt forming surfaces 36A and the male base forming surfaces 38A of the male segments 34A are curved. As FIG. 16 shows, the female mold 24A has the skirt forming surfaces 46A and base forming surfaces 48A of the female opening 26 which are also curved and mate with the curved forming surfaces of the male mold 22A. The male mold 22A and female mold 24A cooperate to produce the flower pot cover 10 with outward fins and a circular shape, rather than the multi-sided shape with flat sides achieved with the male mold 22 and the female mold 24.

Embodiment of FIGS. 17 through 28

FIGS. 17 and 18 illustrate a flower pot cover 10B with inwardly extending fins constructed in accordance with the present invention. The flower pot cover 10B has a base 12B, which is generally frusto-conical in shape, and a skirt 14B extending angularly upward from the base 12B. An opening 16 is formed in the flower pot cover 10B for the insertion of decorative and floral arrangements. A plurality of fins extend radially toward the center of opening 10B from the inner periphery of the base 12B and skirt 14B. One of the inward fins is designated by reference numeral 18B in FIG. 18 and is generally representative of the inward fins of the flower pot cover 10B. The thickness of the sheet of material is exaggerated in FIG. 18 for purposes of illustration.

FIG. 19 illustrates an apparatus constructed in accordance with the present invention for forming the flower pot cover 10B with inwardly extending fins. The apparatus 20B comprises the male mold 22B and the female mold 24B having the opening 26 mating with the male mold 22B. The outer periphery of the male mold 22B is essentially a male forming surface generally corresponding to the size and shape of the flower pot cover 10B to be formed. The male mold 22B includes the pneumatic cylinder 32 or other mechanism for moving the male mold 22B into and out of the opening 26 of the female mold 24B. As shown in FIG. 18, the pneumatic cylinder 32 is attached to a housing 160, which in turn is attached to the upper end of the male mold 22B.

The male mold 22B is sectioned into male segments 34B. The male segments 34B are movable between a normally open position wherein the male segments 34B are separated by spaces and a closed position wherein the male segments 34B are compressed together. The male segments 34B are moved together to press folds in the sheet of material 21 into inwardly extending fins.

The female mold 24B is sectioned into female segments 44B. A female mold finger is positioned within each vertical space between female segments 44B. One of the female mold fingers is designated by reference numeral 152 and is generally representative of the fingers of the female mold 24B. The female mold fingers 152 are movable between a retracted position wherein the fingers 152 are removed from the opening 26 of the female mold 24B and an extended position wherein the fingers 152 extend a distance into the opening 26 of the female mold 24B. With the male segments 34B in the open position and the male mold 22B disposed in the opening 26 of the female mold 24B, the fingers 152 of the female mold 24B can be extended through the vertical spaces between the female segments 44B and into the vertical spaces between the male segments 34B.

FIGS. 20 and 21 illustrate the construction of the male mold 22B. Each male segment 34B of the male mold 22B is rigidly connected to a sliding block 162 by at least one bolt 164 extending through a guide slot 166 formed through a plate 168. The plate 168 is generally circular in shape and is essentially the same size as the circle formed by the upper surface of the male segments 34B. Each guide slot 166 is elongated to allow the respective bolt 164 to travel from end to end of the guide slot 166. When the bolt 164 is at the outer end of the guide slot 166, the attached male segment 34B is in the open position, separated from the adjacent male segments 34B by vertical spaces. When the bolt 164 is at the inner end of the guide slot 166, the attached male segment 34B is pressed against the adjacent male segments 34B in the closed position. Each sliding block 162 slides upon the upper surface of the plate 168 as the attached male segment 34B moves between the open and closed positions.

As best shown in FIG. 21, a spring 172 is positioned between the housing 160 and the inner end of each sliding block 162. Each spring 172 provides pressure to push the bolts 164 of the attached sliding block 162 to the outer ends of the guide slots 166. The springs 172 act to bias the male segments 34B in the open position.

As FIG. 20 illustrates, a vacuum line 174 is connected to the housing 160 and runs down a central portion of the male mold 22B. The vacuum line 174 is attached to a vacuum supply (not shown) and opens into the central portion of the male mold 22B to provide an air suction toward the center of the male mold 22B.

Also shown in FIG. 20 is a plurality of cartridge type heating elements which may be connected to the male mold 22B. One of the heating elements is designated by reference numeral 176 and is generally representative of the heating elements of the male mold 22B. Each of the heating elements 176 is disposed in a cylinder in an inner portion of the male mold 22B and the heating elements 176 are positioned about the male mold 22B to heat the male mold surface to a predetermined temperature level during the operation of the apparatus 20B. Each of the heating elements 176 is connected to an electrical power supply (not shown).

Figure 22:
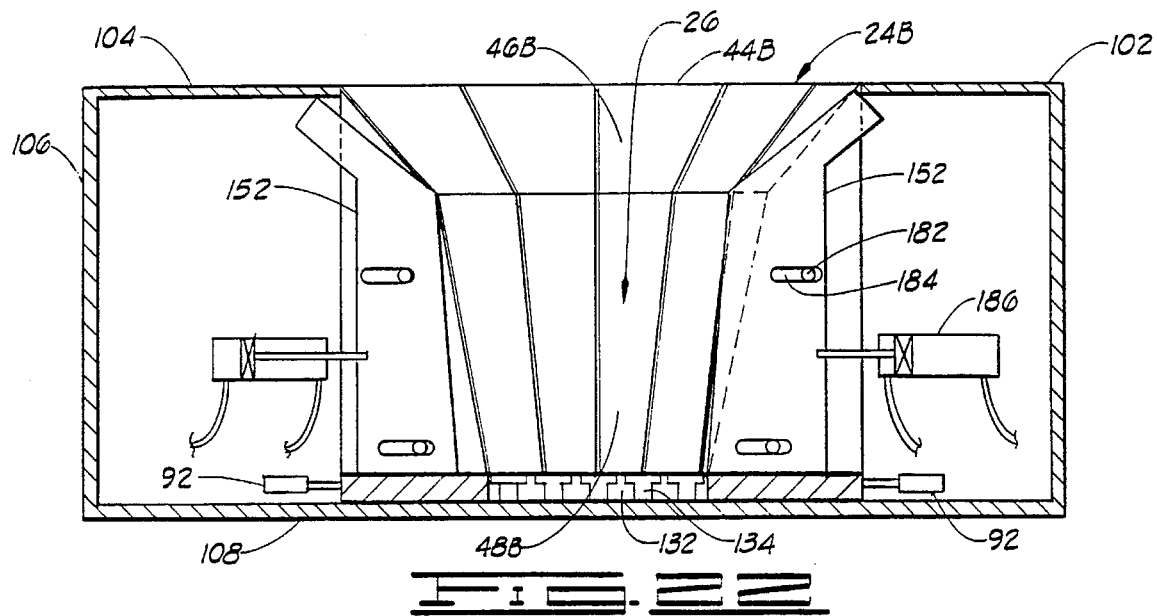
FIG. 22 is a vertical cross-sectional view of the female mold and platform of FIG. 19.
Figure 23:
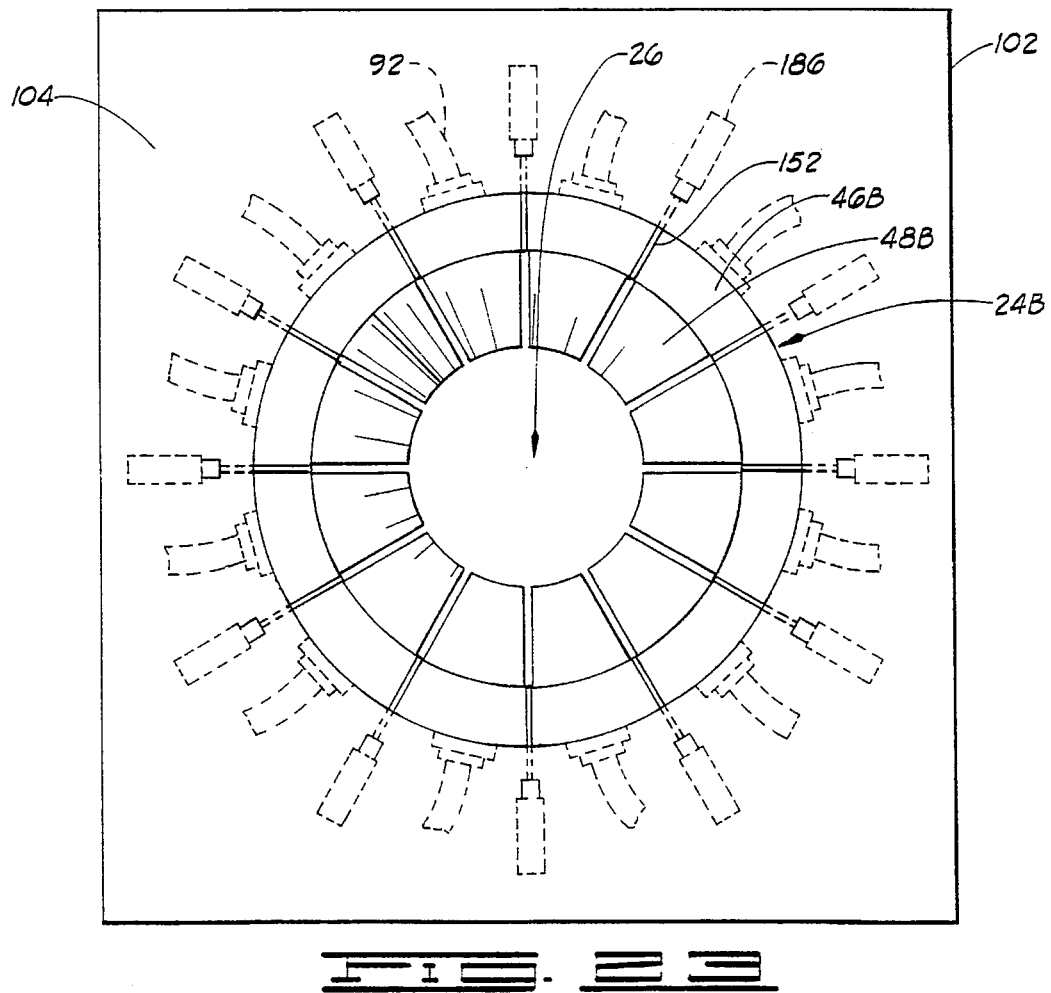
FIG. 23 is a top plan view of the female mold and platform of FIG. 22.

FIG. 22 shows the female mold 24B installed in the platform 102. The female mold 24B is identical to the female mold 24 except for three modifications. First, the female mold 24B has no vacuum lines. Second, the female mold 24B has no cartridge type heating elements. Third, the female mold 24B has the plurality of fingers 152 which are adapted to move in the spaces between the female segments 44B.

Each female mold finger 152 is generally a flat plate, shaped to introduce an inward fin into the skirt and base portions of the female opening 26 when extended into the female opening 26. Each female mold finger 152 is mounted by means of a plurality of pins and guide slots to be extendable into the vertical space between each pair of adjacent female segments 44B. One of the pins is designated by reference numeral 182 and is generally representative of the pins extending between adjacent female segments 44B. One of the guide slots is indicated by reference number 184 and is generally representative of the guide slots formed in the female mold fingers 152. A pneumatic cylinder 186 is attached to each female mold finger 152 for moving the finger 152 between a retracted position and an extended position. In the retracted position, each female mold finger 152 is entirely outside the female opening 26. When extended, a portion of each finger 152 protrudes into the female opening 26 in the fashion of a fin directed toward the center of the female opening 26.

In operation, the male mold 22B is first positioned in the storage position, spaced at a distance from the female mold 24B. The sheet of material 21 is placed between the male mold 22B and the female mold 24B and over the opening 26 of the female mold 24B. Both the male mold segments 34B and the female mold segments 44B are moved to the open position. The female mold fingers 152 are placed in the retracted position.

The male mold 22B is moved into the opening 26 of the female mold 24B, with the sheet of material 21 between the male mold 22B and the female mold 24B. It will be appreciated that, as the male mold 22B is pushed into the opening 26 of the female mold 24B, the vertical spaces between the male mold segments 34B align with the vertical spaces between the female mold segments 44B.

Figure 24:
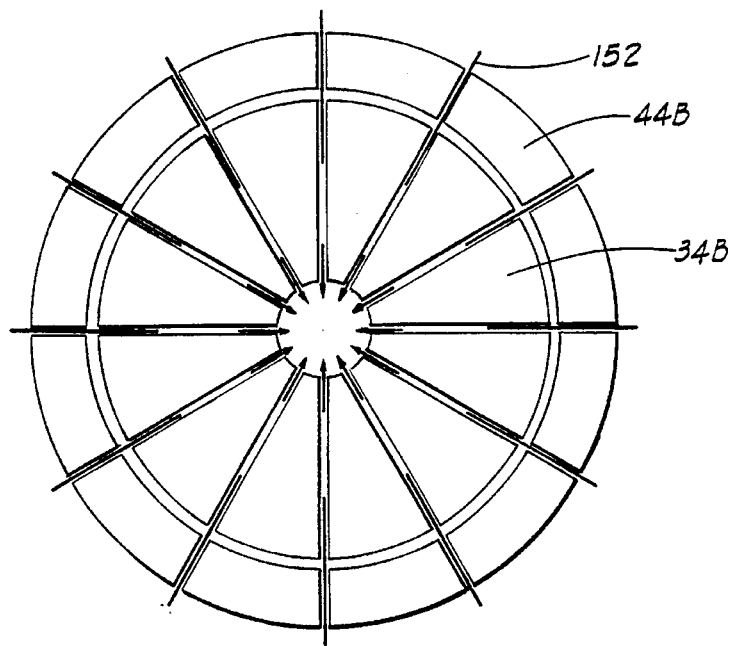
FIG. 24 a horizontal, sectional and diagrammatical view of the male and female molds of FIG. 19 with the male and female segments in the open position and the female mold fingers extended.
Figure 25:
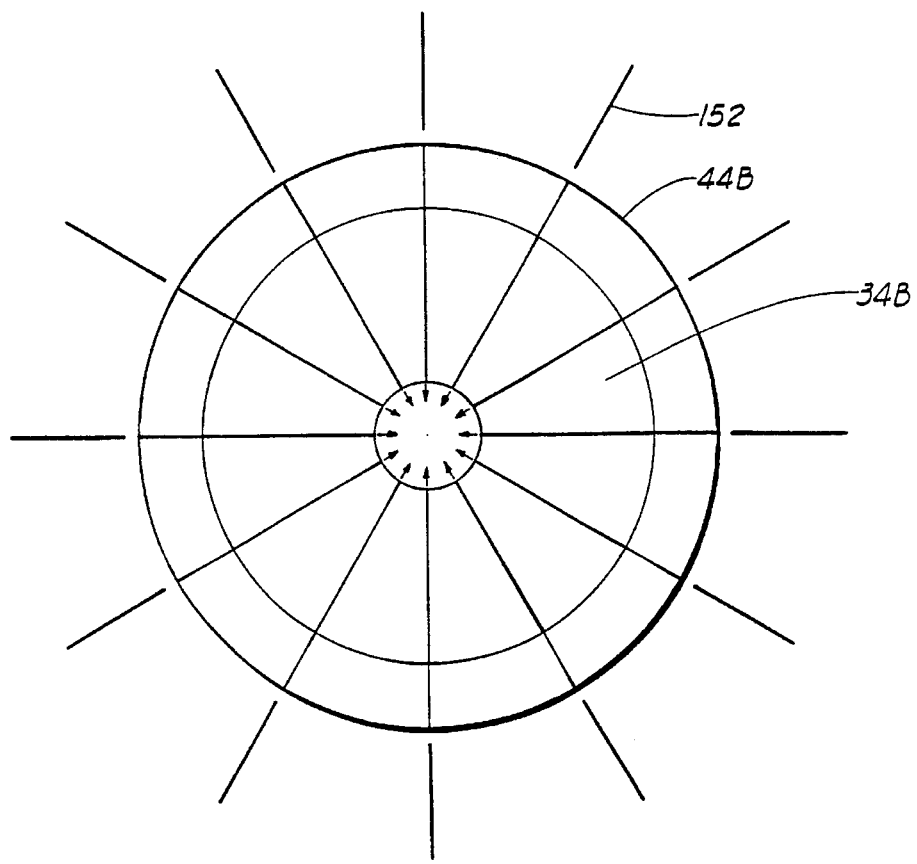
FIG. 25 is the view of FIG. 24 with the male and female segments in the closed position and the female mold fingers retracted.

FIGS. 24 and 25 diagrammatically illustrate how the male mold 22B and the female mold 24B cooperate to form inward fins in the sheet of material 21. As shown in FIG. 24, the female mold fingers 152 are extended through the spaces between the female mold segments 44B to protrude into the spaces between the male mold segments 34B. The protrusion of the female mold fingers 152 in between the male mold segments 44B forces a fold in the sheet of material 21 to be formed between each pair of adjacent male segments 44B. At this time the vacuum of the male mold 22B is activated to draw the folds in the sheet of material 21 toward the center of the male mold 22B, as indicated by the arrows in FIGS. 24 and 25.

Once the folds are in place and the vacuum of the male mold 22B is on, the female mold fingers 152 are moved back to the retracted position. The vacuum of the male mold 22B holds the folds between the male segments 34B. The pneumatic cylinders 92 are then activated to close the female segments 44B. As illustrated by FIG. 25, the female segments 44B close together, push against the male segments 34B to overcome the bias of the springs of the male mold 22B, and cause the male segments 34B to close together also. When the male segments 34B close together, each fold in the sheet of material 21 between the male segments 34B is pressed. If the sheet of material 21 is self-adhering, the sides of each fold adhere to each other and the fins are formed. If the sheet of material 21 is heat-sealant, the heat elements of the male mold 22B supply heat to seal the folds to form fins. At the same time that the fins are being formed, the male mold 22B is pushed fully into the opening 26 of the female mold 24B to form the sheet of material 21 into the shape of the flower pot cover 10B.

After the fins are formed, the pneumatic cylinders 92 move the female segments 44B back to the open position and the springs 172, no longer compressed by the female segments 44B, return the male segments 34B to the open position The male mold 22B is withdrawn from the female opening 26 and returned to the storage position. The vacuum of the male mold 22B is turned off and the flower pot cover 10 with inward fins is removed from the male mold 22B. The apparatus 20B is then ready to repeat the process with another sheet of material 21.

FIGS. 26, 27 and 28 shown another form of flower pot cover 10C, male mold 22C and female mold 24C constructed in accordance with the present invention. As FIG. 26 shows, the flower pot cover 10C is exactly like the flower pot cover 10B, except that the material between the fins 18C is formed to be flat rather than curved. FIGS. 27 and 28 illustrate the male mold 22C and the female mold 24C utilized to form the flat-sided flower pot cover with inward fins 10C. As shown in FIG. 27, the male mold 22C is identical to the male mold 22B, except that the male mold 22C has flat sides making up the skirt and base forming surfaces of the male mold 22C. As illustrated by FIG. 28, the female mold 24C is exactly like the female mold 24B, except that the skirt and base forming surfaces of the female mold 24C are straight and flat rather than curved.

Embodiments Having No Mold

The embodiments disclosed hereinabove utilize molds to form a sheet of material into a flower pot or flower pot cover having fins. However, a sheet of material may be formed into a finned flower pot or flower pot cover without molds. That is, a sheet of material may be formed into a finned flower pot cover by controlling the sheet of material primarily where the fins are to be formed and allowing the rest of the sheet to follow rather than being formed between two molds.

The following description and FIGS. 29 through 45 disclose various preferred embodiments of the present invention which do not use a mold in forming a sheet of material into a flower pot or flower pot cover having fins.

Embodiment of FIGS. 29 through 33

Figure 29:
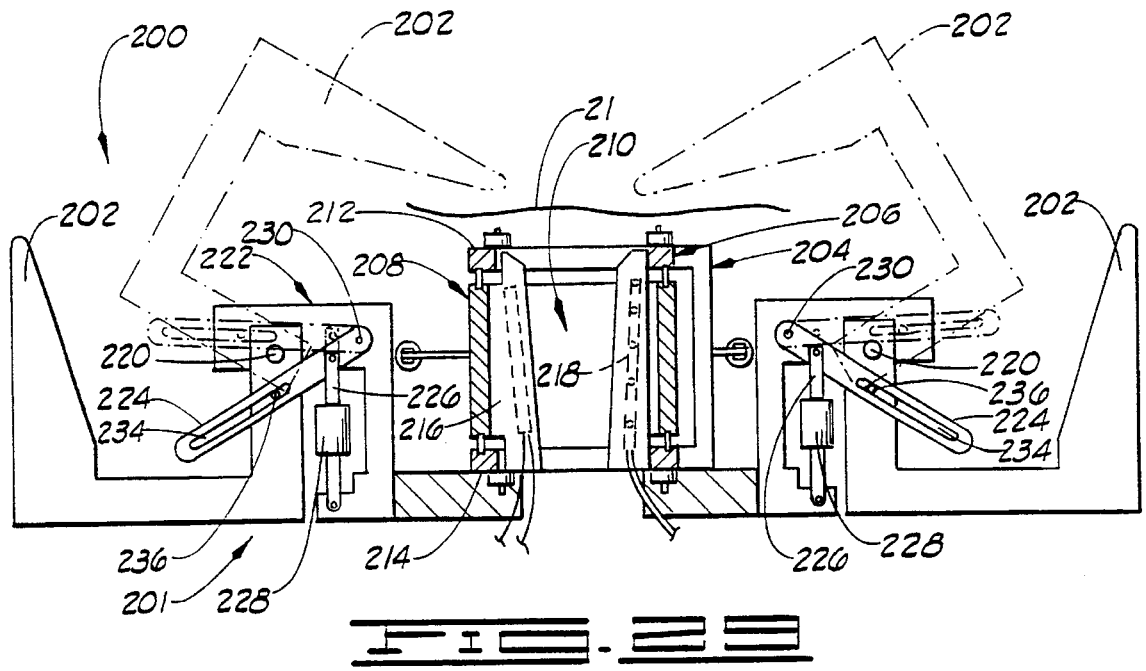
FIG. 29 is a partly diagrammatical, side view of an apparatus constructed in accordance with the present invention having a plurality of blades and a female tool with a plurality of plates for forming outwardly extending fins in a sheet of material. The blades are shown in a storage position.
Figure 30:
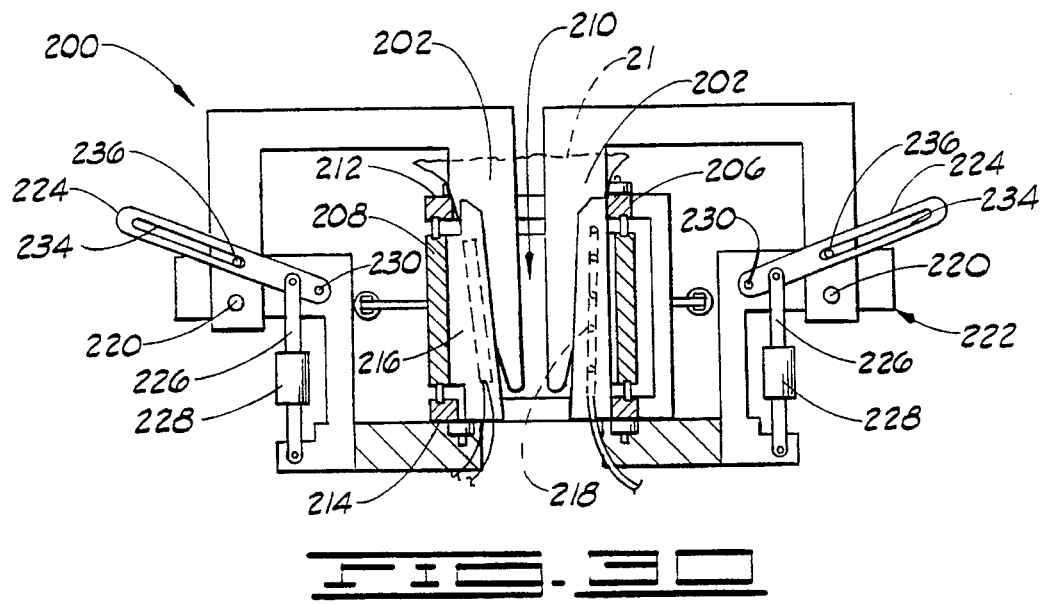
FIG. 30 is the same view as FIG. 29, but with the blades in a forming position.

With reference to FIGS. 29 through 30, shown therein and designated by reference numeral 200 is an apparatus including a blade assembly 201 having a plurality of blades 202 and a female tool 204 for forming a sheet of material 21 into a flower pot or flower pot cover having outwardly extending fins.

The female tool 204 includes an outer frame 206 and an inner cage 208 which define a female opening 210 extending from the upper end 212 toward the lower end 214 of the female tool 204. The outer frame 206 and the inner cage 208 are adapted for rotation about the female opening 210.

The inner cage 208 has a plurality of cage plates which extend laterally from the inner cage 208 into the female opening 210. One of the cage plates is designated by reference numeral 216 and is generally representative of the cage plates of the female tool 204. It should be appreciated that the number of cage plates 216 may be varied greatly depending on how many fins are to be formed in the sheet of material 21.

Similarly, the outer frame 206 has a plurality of frame plates which extend laterally from the outer frame 206 into the female opening 210. One of the frame plates is designated by reference numeral 218 and is generally representative of the frame plates of the female tool 204. In extending into the female opening 210, the frame plates 218 alternate with the cage plates 216 and each frame plate 218 corresponds with one of the cage plates 216 to define a fin-forming pair of plates.

The outer frame 206 and the inner cage 208 are both adapted for rotation about the female opening 210. In rotating the outer frame 206 and inner cage 208, the cage plates 216 and the frame plates 218 are moved between an open position and a closed position.

In the open position, each cage plate 216 is spaced a distance from the corresponding frame plate 218 to define a fin-forming space therebetween. In the closed position, each cage plate 216 and the corresponding frame plate 218 are substantially together. A more detailed description of the female tool 204 is provided hereinbelow.

Turning now to the blade assembly 201, the blades 202 are mounted with a pivot pin 220 to a suitable framework 222 around the female tool 204. Each blade 202 corresponds to one of the fin-forming spaces of the female tool 204 and is adapted to be moved between a storage position and a forming position.

In the storage position, as illustrated by FIG. 29, the blades 202 are spaced a distance from the female tool 204. The blades 202 should be located far enough from the upper end 212 of the female tool 204 to allow placement of a sheet of material 21 over the female opening 210. A position of the blades 202 intermediate of the storage and forming positions is shown in phantom lines in FIG. 29.

In the forming position, shown in FIG. 30, each blade 202 extends into the corresponding fin-forming space of the female tool 204. As the blades 202 are moved into the forming position, the sheet of material 21 is pushed by the blades 202 into the female opening 210. When the blades 202 reach the final forming position, a portion of the sheet of material is pushed by each blade 202 into the corresponding one of the fin-forming spaces of the female tool 204.

Each blade 202 is adapted for movement by a slide bar 224 and a pneumatic piston 226 and cylinder 228. Each slide bar 224 is pivotally connected by pin 230 to the framework 222 and has a slide bar slot 234. In turn, each blade 202 includes a slide pin 236 extending into and traveling along the corresponding slide bar slot 234. Each cylinder 228 is mounted to a lower portion of the framework 222 and each piston 226 is connected to the corresponding slide bar 224 at a point in between the slide bar pin 230 and the slide bar slot 234. With this construction, the blades 202 may be moved by the pistons 226 and cylinders 228 between the storage position and the forming position.

In moving the blades 202 from the storage position to the forming position, the pistons 226 are extended to swing the blades 202 in an arc toward the upper end 212 of the female tool 204 and into the female opening 210 of the female tool 204. A position of the blades 202 between the storage position and the forming position is illustrated by the phantom lines in FIG. 29. The blades 202 are moved back to the storage position by extending the pistons 226 and then retracting the pistons 226.

The blades 202 are then withdrawn from the fin-forming spaces and the plates of the female tool 204 are moved into the closed position to form the portion of the sheet of material in each fin-forming space into a fin. In a manner described hereinbelow, a vacuum may be applied to the portion of the sheet of material in each fin-forming space to hold the portion of the sheet of material in place as the blades 202 are withdrawn. The plates of the female tool 204 may be adapted to heat-seal the portions of the sheet of material in the fin-forming spaces.

Turning now to FIGS. 31 through 33, the female tool 204 is shown therein. As best shown in FIG. 32, the inner cage 208 and the outer frame 206 are both adapted for rotation about a central axis extending between the upper end 212 and the lower end 214 of the female tool 204. The inner cage 208 is mounted within the outer frame 206 by inner roller bearings 238 in order to rotate with respect to the outer frame 208. A cage arm 240 extends from the outside wall of the inner cage 208 and a pneumatic or hydraulic cylinder 242 or actuator or the like is connected to the cage arm 240 to rotate the inner cage 208 in both clockwise and counter-clockwise directions.

The outer frame 206 is contained by outside roller bearings 245 in order to allow rotation of the outer frame 208 about the female opening 210 of the female tool 204. A frame bracket 246 extends from the outer wall of the frame 206. A pneumatic or hydraulic cylinder 248, actuator or the like is connected to the frame bracket 246 to rotate the outer frame 206 in both clockwise and counter-clockwise directions.

The cylinder 242 for rotating the inner cage 208 and the cylinder 248 for rotating the outer frame 206 are positioned on opposite sides of the female tool 204. In this manner, when the pistons of the cylinders 242 and 248 are retracted, the inner cage 208 and the outer frame 206 are rotated counter to one another to space each cage plate 216 a distance from the corresponding frame plate 218.

In the open position of the cage plates 216 and frame plates 218, as illustrated by FIG. 31, the space between each cage plate 216 and the corresponding frame plate 218 defines a fin-forming space 249.

When the pistons of the cylinders 242 and 248 are extended, the inner cage 208 and the outer frame 208 are rotated counter to one another to put the cage plates 216 and the frame plates 218 in a closed position. As shown in FIG. 33, each cage plate 216 and the corresponding frame plate 218 are substantially together when the cage plates 216 and the frame plates 218 are in the closed position.

As best shown in FIG. 32, each frame plate 218 may include a vacuum assembly. One of the vacuum assemblies is designated by reference numeral 250 and is generally representative of the vacuum assemblies of the female tool 204. Each vacuum assembly 250 has a plurality of vacuum ports 252 which communicate through the corresponding frame plate 218 and into the fin-forming space 249. A vacuum hose 253 connected to a vacuum source (not shown) is provided to supply vacuum to the vacuum ports 252.

In addition, each cage plate 216 may include a heating cartridge. One of the heating cartridges is designated by reference numeral 254 and is generally representative of the heating cartridges of the female tool 204. Each heating cartridge 254 is connected to an electric power source (not shown) by electrical wiring 256. Although electrical heating is typically applied to the cage plates 216, any other conventional means for heating the cage plates 216 may be used.

After the blades 202 have pushed the portions of a sheet of material into the fin-forming spaces 249, the vaccum provided by the vacuum assemblies 250 holds the portions of the sheet of material 21 in the fin-forming spaces 249. The blades 202 are withdrawn from the fin-forming spaces 249 and the cage plates 216 and the frame plates 218 are moved into the closed position to form the portions of the sheet of material 21 in the fin-forming spaces 249 into fins. The heat applied to the cage plates 216 heat-seals the fins.

It should be appreciated that the vacuum assemblies 250 may be installed in any suitable arrangement to the frame plates 218, to the cage plates 216 or to both the frame plates 218 and the cage plates 216. Similarly, the heating cartridges 254 may be attached in any combination to the frame plates 218, the cage plates 216 or both the frame plates 218 and the cage plates 216.

Embodiment of FIGS. 34 through 37

With reference now to FIGS. 34 through 37, shown therein and designated by reference character 204A is an alternate embodiment of the female tool 204. The female tool 204A includes an outer shell 260 and a plurality of sliding plates 262. The sliding plates 262 and the outer shell 260 define a female opening 264 which extends from the upper end 266 toward the lower end 268 of the female tool 204A. Although four plates 262 are shown in FIGS. 34 and 36, it should be appreciated that the number of plates 262 in the female tool 204A may be varied depending on how many fins are to be formed in the sheet of material 21.

The outer shell 260 has a shell opening 270 which extends from the upper end 272 to the lower end 274 of the outer shell 260. As best illustrated by FIGS. 35 and 37, the outer shell 260 slopes inward from the upper end 272 toward the lower end 274. Thus the shell opening 270 is wider at the upper end 272 of the outer shell 260 and narrows toward the lower end 274 of the outer shell 260. The outer shell 260 is mounted to any suitable platform or stationary surface 276.

For each sliding plate 262, the sloping portion of the outer shell 260 has a guide slot 278 extending from the top to the bottom of the sloping portion of the outer shell 260. In turn, each sliding plate 262 has a guide member 280 extending from the upper end 282 of the sliding plate 262 to the lower end 284 of the sliding plate 262. The guide member 280 of each sliding plate 262 is disposed into a corresponding one of the guide slots 278. The guide members 280 and guide slots 278 cooperate to hold the sliding plates 262 in proper position while allowing the sliding plates 262 to travel up and down with respect to the outer shell 260.

The wide upper portion of the shell opening 270 is sized and shaped to receive the sliding plates 262 in an open position. As shown by FIG. 34, the sliding plates 262 in the open position are spaced apart to define fin-forming spaces 286 therebetween. The narrow lower portion of the shell opening 270, on the other hand, is sized and shaped to accommodate the sliding plates 262 in a closed position. As illustrated by FIG. 36, the sliding plates 262 in the closed position are forced to be substantially together. The sliding plates 262 are shown to be slightly apart in FIG. 36 for clarity of illustration.

In order to form a skirted flower pot or flower pot cover, the slide plates 262 may have an upper skirt-forming portion 288 and a lower base-forming portion 290. The base-forming portion 290 of each slide plate 262 extends angularly more upward than outward, while the skirt-forming portion 288 extends generally outward from the base-forming portion 290. It should be appreciated that the skirt-forming portion 288 may extend from the base-forming portion 290 at any of a wide variety of angles.

As best shown in FIG. 34, a biasing spring 292 extends across each fin-forming space 286 to bias the slide plates 262 into the open position. Each slide plate 262 has a bore 293 which receives an end portion of the corresponding biasing spring 292. As illustrated by FIGS. 36 and 37, each biasing spring 292 is compressed into the bores 293 when the slide plates 262 are moved into the closed position. In order keep the biasing springs 292 from interfering with the sheet of material 21 in the fin-forming process, the biasing springs 292 should extend between the slide plates 262 toward the outer periphery of the slide plates 262.

As Illustrated by FIGS. 35 and 37, a piston 294 and cylinder 296 are mounted below the slide plates 262 and a bracket member 298 is attached to the lower end 284 of each slide plate 262. The piston 294 has an end member 300 which cooperates with the lower ends 284 and bracket members 298 of the slide plates 262 to move the slide plates 262 in response to movement of the piston 294. The piston 294 and cylinder 296 may be actuated pneumatically, hydraulically, electrically or in any other conventional manner.

When the piston 294 is extended, as shown in FIG. 35, the plates slide plates 262 are moved into the wide upper portion of the shell opening 270 and the springs 292 bias the slide plates 262 into the open position. When the piston 294 is retracted, as shown in FIG. 37, the slide plates 262 are drawn into the narrow lower portion of the shell opening 270 to overcome the bias of the springs 292 and move the slide plates 262 into the closed position.

It should be appreciated that the female tool 204A is used with the blade assembly 201 in substantially the same manner as the female tool 204. After the blades 202 of the blade assembly 201 have pushed a portion of the sheet of material into each fin-forming space 286, the portions of the sheet of material 21 may not stay in place when the blades 202 are removed from the fin-forming spaces 286. To solve this problem, a vacuum is applied to each fin-forming space 286 to hold the portion of the sheet of material 21 in the corresponding fin-forming space 286 as the blades 202 are withdrawn from the fin-forming spaces 286.

As best shown in FIGS. 35 and 37, each slide plate 262 has a plurality of vacuum orifices 302, which communicate with the corresponding fin-forming space 286. A vacuum hose 304 connects the orifices 302 to a vacuum source (not shown). The vaccum is typically switched on just after the blades 202 have reached their forming position between in the fin-forming spaces 286 and is turned off when the portions of the sheet of material 21 have be formed into fins.

Each plate may also be provided with a heating cartridge 306 to heat-seal the fins formed in the sheet of material 21. Each heating cartridge 306 is connected by electrical wires 308 to a suitable electrical power source (not shown). Although electric heat is typically utilized, any conventional means for heating the slide plates 262, and particularly the portion of the slide plates 262 at the fin-forming surfaces, may be employed.

Embodiment of FIGS. 38 through 45

With reference now to FIGS. 38 and 39, shown therein and designated by reference numeral 310 is an apparatus for forming a sheet of material 21 into a flower pot or flower pot cover having inwardly extending fins. The apparatus 310 comprises a male tool 312 and a blade assembly 314.

The male tool 310 has a first plate assembly 316 and a second plate assembly 318 suspended from a stationary support bar 320 upon a shaft 322. The shaft 322 is journaled through a hole in the support bar 320 and includes an end cap 324 which rests on the upper surface of the support bar 320. It should be appreciated that the shaft 322 is rotatably disposed in the hole of the support bar 320.

The first plate assembly 316 includes an upper frame member 326 and a lower frame member 328, which are both rigidly attached to the shaft 322. A plurality of first plates are mounted in spaced relationship between the upper frame member 326 and the lower frame member 328 of the first plate assembly 316 and extend laterally outward. One of the first plates is designated by reference numeral 330 and is generally representative of the first plates of the male tool 310.

Similarly, the second plate assembly 318 includes an upper frame member 332 and a lower frame member 334. The upper frame member 332 and the lower frame member 334 of the second plate assembly 318, however, are rigidly attached to a bearing sleeve 336 which is rotatably disposed around the shaft 322. Thus the first plate assembly 316 rotates with the shaft 322, while the second plate assembly 318 rotates with the bearing sleeve 326 about the shaft 322.

A plurality of second plates are mounted in spaced relationship between the upper frame member 332 and the lower frame member 334 of the second plate assembly 318 and extend laterally outward. One of the second plates is designated by reference numeral 340 and is generally representative of the second plates of the male tool 310.

The first plates 330 and the second plates 340 are arranged in an alternating pattern with each first plate 330 corresponding to one of the second plates 340 to define a fin-forming pair. The first plate assembly 316 and the second plate assembly 318 are adapted to move the first plates 330 and the second plates 340 between an open position and a closed position.

In the open position, each first plate 330 is spaced a distance from the corresponding second plate 340 to define a fin-forming space 342 therebetween. In the closed position, each first plate 330 and the corresponding second plate 340 are substantially together.

The blade assembly 314 is located below the lower end 344 of the male tool 310 and includes a plurality of blades 346 connected together by a central member 348. The central member 348 has an upper pedestal portion 350, which is shaped to engage the lower end 344 of the male tool 310, and a lower blade slide support portion 352, which has a link arm 354 for each blade 346. Each link arm 354 has a link slot 356 which receives a sliding pin 358 of the corresponding blade 346.

A blade pivot support member 360 is positioned below the central member 348 and includes a plurality of pivot support arms 362 which extend upward to support the blades 346 for pivoting movement. Each blade 346 is mounted to a corresponding one of the pivot support arms 362 by a pivot pin 364. A stop member 366 extends from at least one of the pivot supports arms 362 to engage the corresponding link arm 362 and keep the blades from pivoting below the central member 348.

A piston 368, operated by a cylinder 370, is connected to the lower end 372 of the blade pivot support member 360 to move the blade pivot support member 360 toward and away from the lower end 344 of the male tool 310. The cylinder 370 is typically a pneumatic cylinder, but may be a hydraulic cylinder, an electric actuator or any other conventional device for driving reciprocating movement.

A tensioning spring 374 is located between the central member 348 and the blade pivot support member 360. The tensioning spring 374 provides a soft movement of the pedestal 350 to engage the sheet of material 21, followed by pivoting movement of the blades 346.

Although only two blades 346 are shown in FIGS. 38 and 39, it should be appreciated that the number of blades 346 in the blade assembly 314 may vary widely. Of course, there should be a blade 346 and a corresponding fin-forming space 342 in the male tool 312 for each fin to be formed in the sheet of material 21.

Turning now to FIGS. 40 through 45, therein the structure and features of the male tool 312 are illustrated in greater detail. As shown in FIGS. 40 through 42, the upper frame member 326 of the first plate assembly 316 has a first cam-hole 376 with a first bevel 378. Similarly, the upper frame member 332 of the second plate assembly 318 has a second cam-hole 380 with a second bevel 382. As best illustrated by FIG. 41, the first bevel 378 and the second bevel 382 are angled in opposing directions.

As shown in FIG. 42, a cylinder 384 is attached to the support bar 320 and has a piston cam 386 extending downward. The piston cam 386 includes an end portion 388 which is extendable through the first cam-hole 376 and the second cam-hole 382. As best illustrated by FIG. 41, the end portion 388 of the piston cam 386 has a first cam bevel 391 and a second cam bevel 392.

When the cylinder 384 extends the piston cam 386 downward, as indicated by arrow 395, the first cam bevel 391 engages the first bevel 378 and pushes the upper frame member 326 of the first plate assembly 316 in a direction indicated by arrow 396. At the same time, the second cam bevel 392 engages the second bevel 382 of the upper frame member 332 of the second plate assembly 318 and pushes the upper frame member 332 of the second plate assembly 318 in a direction indicated by arrow 398.

Accordingly, the downward extension of the piston cam 386 rotates the first plate assembly 316 and the shaft 322 in one direction, as indicated by arrow 400 in FIG. 40, and rotates the second plate assembly 318 in the counter direction, indicated by arrow 402 in FIG. 40. Thus the downward movement of the piston cam 386 moves the first plates 330 and the second plates 340 from the open position shown in FIG. 40 to the closed position illustrated by FIG. 43.

While downward movement of the piston cam 386 moves the first plates 330 and the second plates 340 into the closed position, the converse is not true. That is, upward movement of the piston cam 386 does not return the first plates 330 and the second plates 340 to the open position shown in FIG. 40. Return of the first plates 330 and the second plates 340 to the open position is necessary for proper coordination of the blades 346 with the plates 330 and 340.

In order to bias the first plates 330 and the second plates 340 into the open position, the male tool 312 includes a first bias assembly 406 and a second bias assembly 408. The first bias assembly 406 provides a fixed reference point and bias to the open position for the first plate assembly 316 and the second bias assembly 408 does the same for the second plate assembly 318.

As shown in FIGS. 42, 44 and 45, the first bias assembly 406 comprises a bias arm 410, which is rigidly attached to the shaft 322, and a first block 412, which is rigidly mounted to the underside of the stationary support bar 320. A first biasing spring 414 extends between the bias arm 410 and the first block 412. A first set screw 416 extends through the first block 412 to provide a mechanism for adjusting the biased position of the first plate assembly 316.

The biased position illustrated by FIG. 44 corresponds to the open position of the first plates 330 in FIG. 40. In contrast, the first bias assembly 406 shown in FIG. 43 corresponds to FIG. 45, wherein the bias of the first biasing spring 414 is overcome by the rotation of the first plate assembly 316 to place the first plates 330.

The second bias assembly 408 takes its stationary reference point from the first bias assembly 406. As best illustrated by FIG. 40, the second bias assembly 408 includes a second block 418, a biasing post 420, a second biasing spring 422 and a second set screw 424. The second block 418 is rigidly attached to the upper side of the top frame member 326 of the first plate assembly 316. The biasing post 420 is rigidly attached to the upper side of the top frame member 332 of the second plate assembly 318 and extends through a biasing post aperture 426 through the top frame member 326 of the first plate assembly 316.

The second biasing spring 422 extends between the biasing post 420 and the second block 418. For adjustment of the biased position of the second plate assembly 318, the second set screw 424 extends through the second block 418 toward the biasing post 420.

As illustrated by FIG. 40, the second biasing spring 422 biases the second plates 340 into the open position. As shown in FIG. 43, the rotation of the second plate assembly 318 overcomes the bias of the second biasing spring 422 to put the second plates 340 into the closed position.

The male tool 312 may include a plurality of vacuum conduits connected to a vacuum source (not shown) for releasably holding the sheet of material 21 in the fin-forming spaces 342 while the first plates 330 and second plates 340 are being moved from the open position into the closed position. One of the vacuum conduits is designated by reference numeral 428 and is generally representative of the vacuum conduits of the male tool 312. As illustrated by FIG. 42, each vacuum conduit 428 communicates with a plurality of vacuum ports 430 which open laterally into the corresponding fin-forming space 342. It should be appreciated that the vacuum ports 430 may extend laterally through any combination of first plates 330 or second plates 340.

Similarly, the male tool 312 may include a plurality of heat cartridges for heat-sealing the portion of the sheet of material in the fin-forming spaces 342. One of the heat cartridges is designated by reference numeral 432 and is generally representative of the heat cartridges of the male tool 312. It should be understood that the heat cartridges 432, like the vacuum ports 430, may be connected to any combination of first plates 330 or second plates 340.

In operation, a sheet of material 21 is disposed between the lower end 344 of the male tool 312 and the blade assembly 314, as shown in FIG. 38. Then the piston 368 of cylinder 370 is extended to push the sheet of material 21 against the lower end 344 of the male tool 312 and to move each blade 346 into the corresponding fin-forming space 342 of the male tool 312, as illustrated by FIG. 39.

Each blade 346 forces a portion of the sheet of material 21 into the corresponding fin-forming space 342 of the male tool 312. At this time, vacuum may be applied through the vacuum conduits 428 and vacuum ports 430 to hold the portions of material 21 in the fin-forming spaces 342 and the blades 346 may be withdrawn from the fin-forming spaces 342.

Then the piston cam 386 of the male tool 312 is extended downward to move the first plates 330 and the second plates 340 into the closed position. Heat may be applied through the heat cartridges 432 to heat seal the portions of the sheet of material 21 in the fin-forming spaces 342. At this time, the sheet of material 21 is formed into a flower pot or flower pot cover having inwardly extending fins.

The piston 368 of the blade assembly 314 is withdrawn to return the blades 346 to the storage position and the piston cam 386 is retracted upward to return the first plates 330 and second plates 340 to the open position. The vacuum to the vacuum ports 430 may then be shut off and the flower pot or flower pot cover with inwardly extending fins may be removed from the male tool 312.

Embodiments Having One Mold

The molds, tools and blades may be combined in various other ways for forming a sheet of material into a flower pot or flower pot cover having fins. For example, one mold may be utilized with a blade assembly or a tool to control and form the sheet of material.

In making a flower pot or flower pot cover having outwardly extending fins, similar to that shown in FIGS. 1 and 2, the female mold 24 (FIG. 11) may be used in combination with the blade assembly 201 (FIGS. 29 and 30). Alternatively, the female tool 204 (FIG. 32) may be used in cooperation with the male mold 22 (FIG. 3).

To form a sheet of material into a flower pot or flower pot cover having inwardly extending fins, similar to that illustrated by FIGS. 17 and 18, the male mold 22B (FIG. 20) may be utilized with the blade assembly 314 (FIGS. 38 and 39). In another embodiment, the male tool 312 (FIG. 42) may be used in conjunction with the female mold 24B (FIG. 22).

In the operation of these one-mold embodiments, each mold, blade assembly and tool is used in substantially the same way as described hereinabove. A mold is merely substituted for one of the tools or blade assemblies as appropriate.

Changes may be made in the combinations, operations and arrangements of the various parts and elements described herein or in the steps or sequence of steps of the methods described herein without departing from the spirit and scope of the invention as defined in the following claims.

What is claimed is:

1. A method of forming a sheet of material into a flower pot or flower pot cover having outwardly extending fins, the steps of the method comprising:

providing a female tool having a female opening and a plurality of plates extending into the female opening, the plates being movable between an open position wherein the plates are spaced apart to define fin-forming spaces therebetween and a closed position wherein the plates are substantially closed together;

providing a plurality of blades adapted for movement between a storage position wherein the blades are spaced a distance from the female opening and a fin-forming position wherein each blade extends into a corresponding one of the fin-forming spaces;

placing a sheet of material over the female opening of the female tool;

moving the blades into the fin-forming position to push a portion of the sheet of material into each fin-forming space; and moving the plates into the closed position to form the portions of the sheet of material in the fin-forming spaces into fins.

2. The method of claim 1 further comprising the step of: withdrawing the blades from the fin-forming spaces.

3. The method of claim 2 wherein the steps of withdrawing the blades from the fin-forming spaces and moving the plates into the closed position are performed substantially at the same time.

4. The method of claim 1 further comprising the step of: creating a vacuum to hold the portions of the sheet of material in place in the fin-forming spaces.

5. The method of claim 1 further comprising the step of: heating the portions of the sheet of material within the fin-forming spaces.

6. A method for forming a sheet of material into a flower pot or flower pot cover having outwardly extending fins, the steps of the method comprising:

providing a female tool having an outer shell and a plurality of plates, the outer shell defining a female opening having a first end and a second end, female opening having a size reduction from the first end toward the second end, the plates being disposed within the female opening for movement between the first and second ends of the female opening;

providing means for biasing the plates toward the first end of the female opening wherein the plates are separated to define fin-forming spaces therebetween;

providing means for moving the plates toward the second end of the female opening such that the plates close together in response to movement through the size reduction of the female opening from the first end toward the second end of the female opening;

providing a plurality of blades adapted for movement between a storage position wherein the blades are spaced a distance from the female opening and a fin-forming position wherein each one of the blades extends into a corresponding one of the fin-forming spaces;

placing a sheet of material over the female opening of the female tool;

moving the blades into the fin-forming position to push a portion of the sheet of material into each fin-forming space; and moving the plates from the first end toward the second end of the female opening to close the plates together such that the portions of the sheet of material in the fin-forming spaces are formed into fins.

7. The method of claim 6 further comprising the steps of:

allowing the plates to return toward the first end of the female opening after the fins are formed; and withdrawing the blades from the fin-forming spaces after the fins are formed.

8. The method of claim 6 further comprising the step of: creating a vacuum to hold portions of the sheet of material in place in the fin-forming spaces.

9. The method of claim 6 further comprising the step of: heating the portions of the sheet of material within the fin-forming spaces.

10. A method for forming a sheet of material into a flower pot or flower pot cover having outwardly extending fins, the steps of the method comprising:

providing a female tool having an outer shell and a plurality of plates, the outer shell having a first end, a second end and an inner surface extending from the first end to the second end to define a female opening, the plates being disposed for movement along the inner surface of the outer shell, the inner surface being adapted to allow the plates to separate when the plates are moved toward the first end of the outer shell and to close the plates together when the plates are moved toward the second end of the outer shell;

providing means for moving the plates toward the second end of the outer shell;

providing a plurality of blades adapted for movement between a storage position wherein the blades are spaced a distance from the female opening and a fin-forming position wherein each one of the blades extends into a corresponding one of the fin-forming spaces;

placing a sheet of material over the female opening of the female tool;

moving the blades into the fin-forming position to push a portion of the sheet of material into each fin-forming space; and moving the plates from the first end toward the second end of the outer shell to close the plates together such that the sheet of material is formed into a flower pot or flower pot cover, and such that the portions of the sheet of material in the fin-forming spaces are formed into fins extending outwardly from the flower pot or flower pot cover.

11. The method of claim 10 further comprising the step of:

heating the portions of the sheet of material within the fin-forming spaces.

12. The method of claim 10 further comprising the step of: providing means for biasing the plates apart to define fin-forming spaces therebetween when the plates are located toward the first end of the outer shell.

13. The method of claim 10 further comprising the step of:

creating a vacuum to hold portions of the sheet of material in place in the fin-forming spaces.

* * * * *

UNITED STATES PATENT AND TRADEMARK OFFICE
CERTIFICATE OF CORRECTION

PATENT NO. : 5,523,046
DATED : June 4, 1996
INVENTOR(S) : Weder et al.

It is certified that error appears in the above-identified patent and that said Letters Patent is hereby corrected as shown below:

Cover Page, Related U.S. Application Data [63], please delete the entire history and insert the following:

--Continuation-in-part of Ser. No. 07/805,419, Dec. 10, 1991, Pat. No. 5,221,248, which is a continuation-in-part of Ser. No. 07/422,653, Oct. 17, 1989, Pat. No. 5,073,161, which is a continuation-in-part of Ser. No. 07/397,114, Aug. 22, 1989, Pat. No. 5,029,412; said Ser. No. 07/422,653 is continuation-in-part of Ser. No. 07/366,588, June 15, 1989, Pat. No. 5,111,613, and a continuation-in-part of Ser. No. 07/219,083, July 13, 1988, Pat. No. 4,897,031, which is a continuation of Ser. No. 07/004,275, Jan. 5, 1987, Pat. No. 4,773,182, which is a continuation of Ser. No. 06/613,080, May 22, 1984, abandoned; said Ser. No. 07/422,653 is a continuation-in-part of Ser. No. 07/367,098, June 15, 1989, Pat. No. Des. 318,030, which is a continuation-in-part of Ser. No. 07/283,014, Dec. 8, 1988, abandoned, which is a continuation of Ser. No. 06/652,903, Sept. 21, 1984, abandoned, which is a continuation-in-part of Ser. No. 06/613,053, May 22, 1984, Pat. No. Des. 293,224; said Ser. No. 07/805,419 is a continuation-in-part of Ser. No. 07/710,272, June 4, 1991, Pat. No. Des. 365,302, which is a continuation-in-part of Ser. No. 07/617,454, Nov. 21, 1990, abandoned; said Ser. No. 07/710,272 is a continuation-in-part of Ser. No. 07/411,249, Sept. 22, 1989, Pat. No. Des. 358,113, and a continuation-in-part of Ser. No. 07/411,247, Sept. 22, 1989, abandoned, and a continuation-in-part of Ser. No. 07/411,245, Sept. 22, 1989, abandoned.--

UNITED STATES PATENT AND TRADEMARK OFFICE
CERTIFICATE OF CORRECTION

PATENT NO. : 5,523,046
DATED : June 4, 1996
INVENTOR(S) : Weder et al.

It is certified that error appears in the above-identified patent and that said Letters Patent is hereby corrected as shown below:

Cover Page, References Cited [56], U.S. Patent Documents, please insert the following:

-- 
| | | | |
|---|---|---|---|
| 735,729 | 08/1903 | Dowling | |
| 1,124,618 | 01/1915 | House | |
| 1,645,931 | 10/1927 | Ruckert et al. | 93/60 |
| 2,959,110 | 11/1960 | Thoma | 93/60 |
| 3,007,377 | 11/1961 | Muller | 53/580 |
| 4,733,521 | 03/1988 | Weder et al. | 47/72 |
| 4,773,182 | 09/1988 | Weder et al. | 425/388 |
| 4,897,031 | 01/1990 | Weder et al. | 47/72 |
| 5,029,412 | 07/1991 | Weder et al. | 493/154 |
| 5,073,161 | 12/1991 | Weder et al. | 156/212 |
| 5,076,874 | 12/1991 | Weder | 47/72 |
| 5,111,613 | 05/1992 | Weder et al. | 156/212 |
| 5,120,382 | 06/1992 | Weder | 425/383 |
| 5,127,817 | 07/1992 | Weder et al. | 493/154 |
| 5,176,609 | 01/1993 | Weder et al. | 491/133 |
| 5,221,248 | 06/1993 | Weder et al. | 156/227 |
| 5,228,934 | 07/1993 | Weder et al. | |

--

UNITED STATES PATENT AND TRADEMARK OFFICE
CERTIFICATE OF CORRECTION

PATENT NO.  : 5,523,046

DATED       : June 4, 1996

INVENTOR(S) : Weder et al.

It is certified that error appears in the above-identified patent and that said Letters Patent is hereby corrected as shown below:

In the drawings, Figure 31, please insert reference numeral --249--.

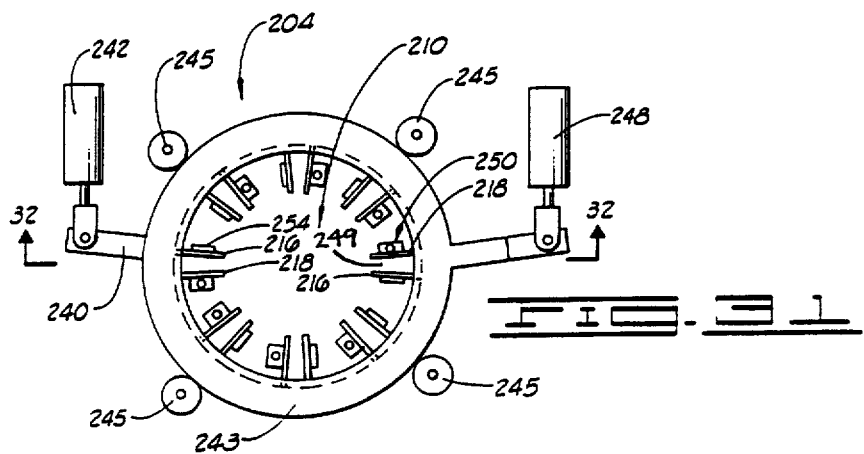

UNITED STATES PATENT AND TRADEMARK OFFICE
CERTIFICATE OF CORRECTION

PATENT NO. : 5,523,046

DATED : June 4, 1996

INVENTOR(S) : Weder et al.

It is certified that error appears in the above-identified patent and that said Letters Patent is hereby corrected as shown below:

In the drawings, Figures 34 and 36, please insert reference numeral --293--.

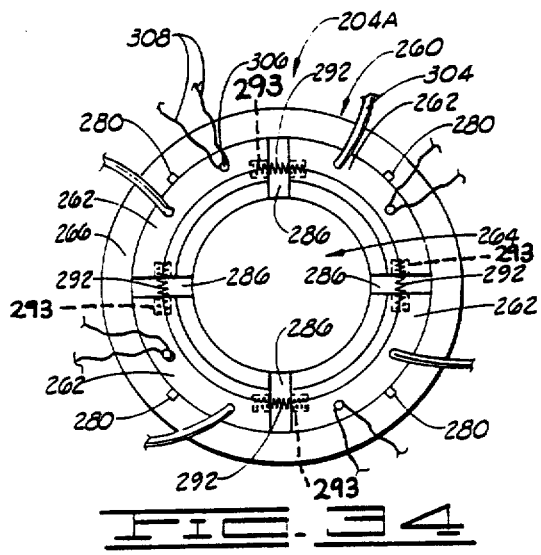
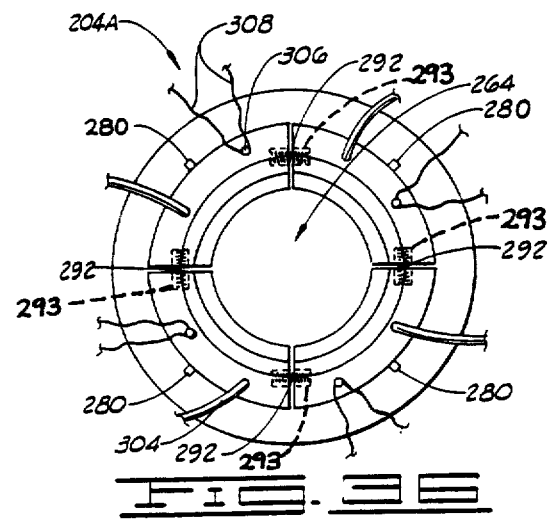

UNITED STATES PATENT AND TRADEMARK OFFICE
CERTIFICATE OF CORRECTION

PATENT NO. : 5,523,046

DATED : June 4, 1996

INVENTOR(S) : Weder et al.

It is certified that error appears in the above-identified patent and that said Letters Patent is hereby corrected as shown below:

In the drawings, Figures 35 and 37, please insert reference numeral --282--.

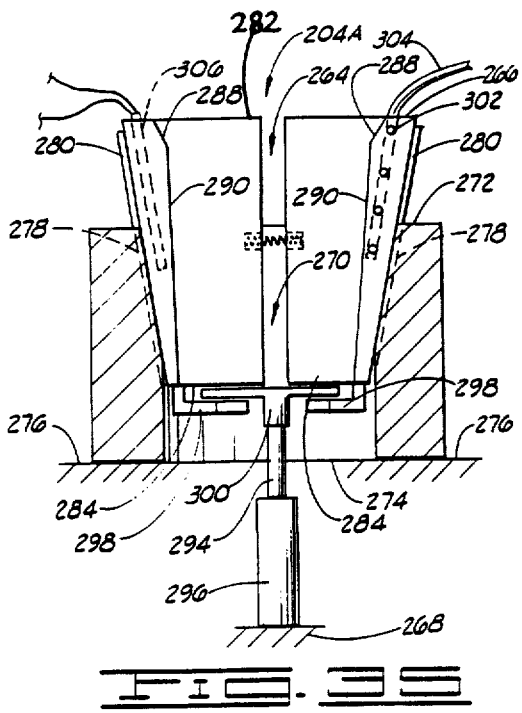

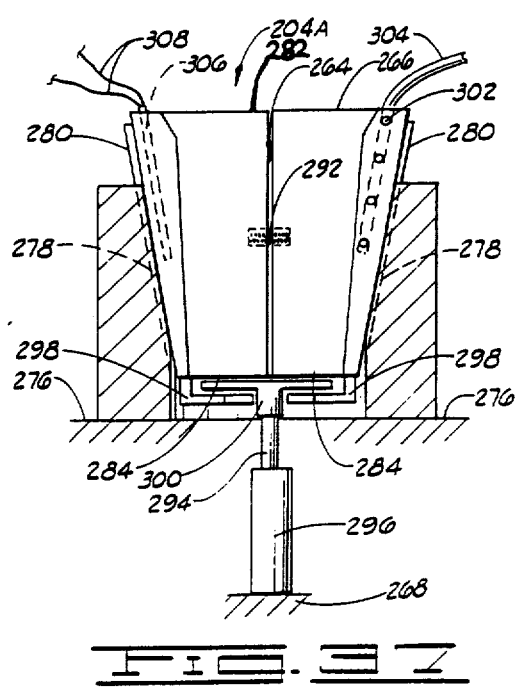

UNITED STATES PATENT AND TRADEMARK OFFICE
CERTIFICATE OF CORRECTION

PATENT NO. : 5,523,046
DATED : June 4, 1996
INVENTOR(S) : Weder et al.

It is certified that error appears in the above-identified patent and that said Letters Patent is hereby corrected as shown below:

In the drawings, Figure 38, please insert reference numeral --366--.

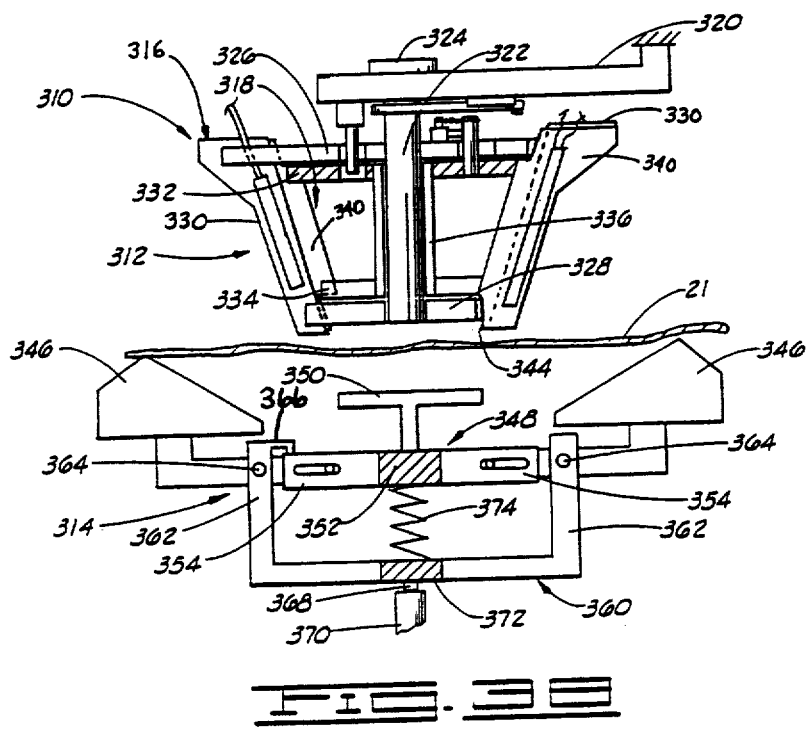

FIG. 38

UNITED STATES PATENT AND TRADEMARK OFFICE
CERTIFICATE OF CORRECTION

PATENT NO. : 5,523,046

DATED : June 4, 1996

INVENTOR(S) : Weder et al.

It is certified that error appears in the above-identified patent and that said Letters Patent is hereby corrected as shown below:

In the drawings, Figure 39, please insert reference numeral --366--.

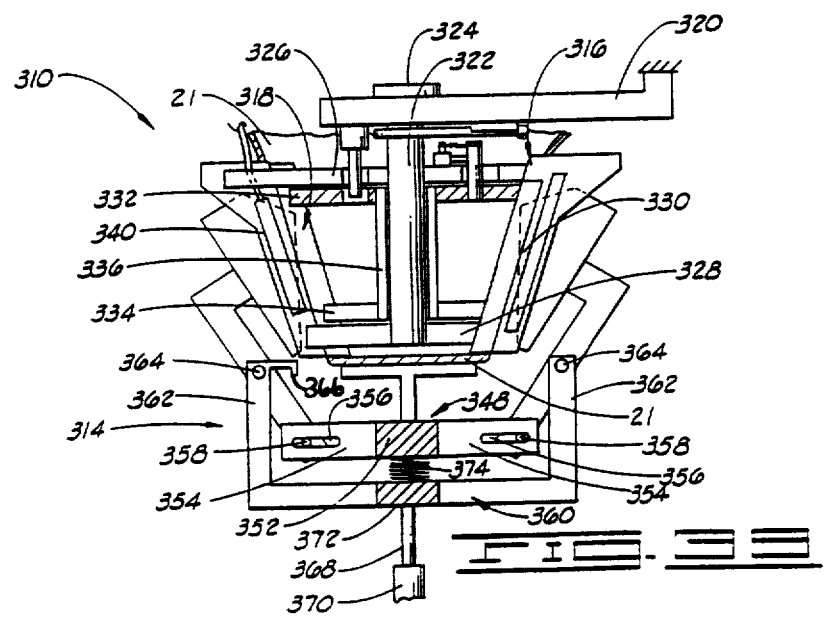

UNITED STATES PATENT AND TRADEMARK OFFICE
CERTIFICATE OF CORRECTION

PATENT NO. : 5,523,046

DATED : June 4, 1996

INVENTOR(S) : Weder et al.

It is certified that error appears in the above-identified patent and that said Letters Patent is hereby corrected as shown below:

In the drawings, Figure 40, please insert reference numeral --342--.

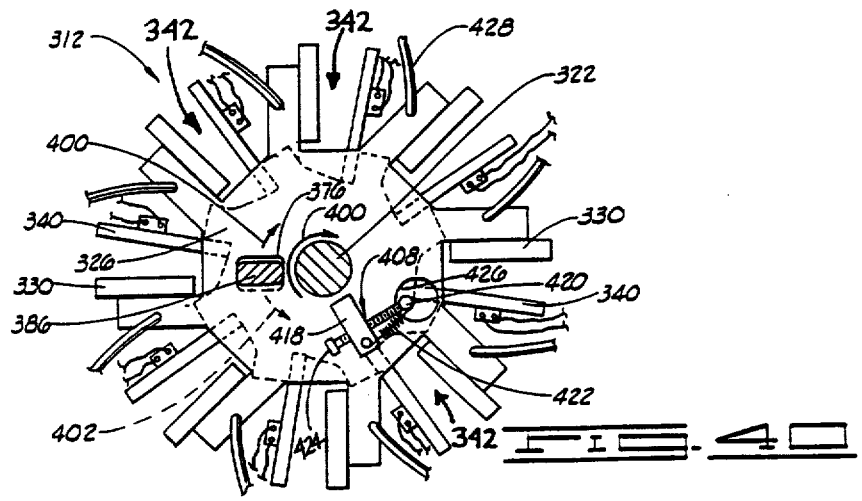

UNITED STATES PATENT AND TRADEMARK OFFICE
CERTIFICATE OF CORRECTION

PATENT NO. : 5,523,046

DATED : June 4, 1996

INVENTOR(S) : Weder et al.

It is certified that error appears in the above-identified patent and that said Letters Patent is hereby corrected as shown below:

In the drawings, Figures 41 and 42, please insert reference numeral --388--.

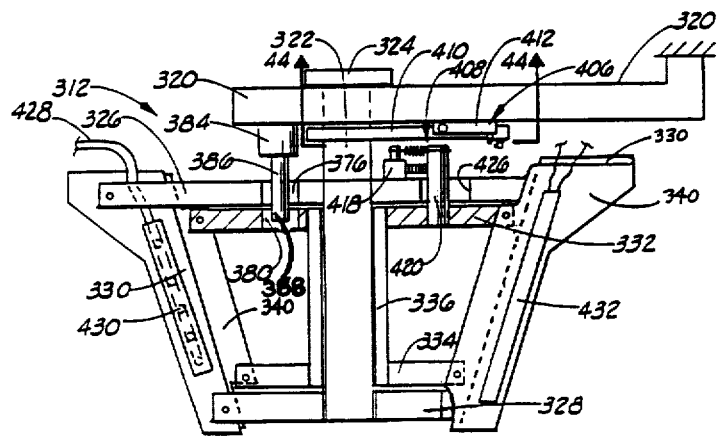

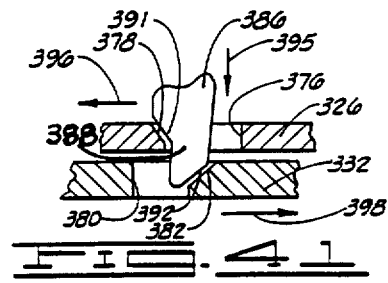

UNITED STATES PATENT AND TRADEMARK OFFICE
CERTIFICATE OF CORRECTION

PATENT NO. : 5,523,046

DATED : June 4, 1996

INVENTOR(S) : Weder et al.

It is certified that error appears in the above-identified patent and that said Letters Patent is hereby corrected as shown below:

Column 1, lines 10-50, delete the entire history and substitute therefor:

-- The present application is a continuation-in-part of Ser. No. 07/805,419, filed Dec. 10, 1991, entitled "FLOWER POT OR FLOWER POT COVER WITH FINS", issued as Pat. No. 5,221,248 on June 22, 1993; which is a continuation-in-part of Ser. No. 07/422,653, filed Oct. 17, 1989, entitled "FLOWER POT OR FLOWER POT COVER WITH CONTROLLED PLEATS", issued as Pat. No. 5,073,161 on Dec. 17, 1991; which is a continuation-in-part of Ser. No. 07/397,114, filed Aug. 22, 1989, issued as Pat. No. 5,029,412 on July 9, 1991;

Ser. No. 07/422,653 is continuation-in-part of Ser. No. 07/366,588, filed June 15, 1989, issued as Pat. No. 5,111,613 on May 12, 1992; and a continuation-in-part of Ser. No. 07/219,083, filed July 13, 1988, issued as Pat. No. 4,897,031 on Jan 30, 1990; which is a continuation of Ser. No. 07/004,275, filed Jan. 5, 1987, issued as Pat. No. 4,773,182 on Sept. 27, 1988; which is a continuation of Ser. No. 06/613,080, filed May 22, 1984, abandoned;

Ser. No. 07/422,653 is a continuation-in-part of Ser. No. 07/367,098, filed June 15, 1989, issued as Pat. No. Des. 318,030 on July 9, 1991; which is a continuation-in-part of Ser. No. 07/283,014, filed Dec. 8, 1988, abandoned; which is a continuation of Ser. No. 06/652,903, filed Sept. 21, 1984, abandoned; which is a continuation-in-part of Ser. No. 06/613,053, filed May 22, 1984, issued as Pat. No. Des. 293,224 on Dec. 15, 1987;

UNITED STATES PATENT AND TRADEMARK OFFICE
CERTIFICATE OF CORRECTION

PATENT NO. : 5,523,046
DATED : June 4, 1996
INVENTOR(S) : Weder et al.

It is certified that error appears in the above-identified patent and that said Letters Patent is hereby corrected as shown below:

Ser. No. 07/805,419 is a continuation-in-part of Ser. No. 07/710,272, filed June 4, 1991, entitled "FLOWER POT COVER", issued as Pat. No. Des. 365,302 on Dec. 19, 1995; which is a continuation-in-part of Ser. No. 07/617,454, filed Nov. 21, 1990, abandoned;

Ser. No. 07/710,272 is a continuation-in-part of Ser. No. 07/411,249, filed Sept. 22, 1989, issued as Pat. No. Des. 358,113 on May 9, 1995; and a continuation-in-part of Ser. No. 07/411,247, filed Sept. 22, 1989, abandoned; and a continuation-in-part of Ser. No. 07/411,245, filed Sept. 22, 1989, abandoned.--

Column 4, line 16, please delete "hydraulic cylinder 32" and substitute therefor --pneumatic cylinder 32--.

Column 4, line 18, please delete "hydraulic cylinder 32" and substitute therefor --pneumatic cylinder 32--.

Column 4, line 32, before "fingers" please delete "of".

Column 4, line 66, please delete "polymer films".

Column 5, lines 26-27, please delete "fingers 36" and substitute therefor --fingers 40--.

Column 6, line 6, please delete "finger 36" and substitute therefor --finger 40--.

UNITED STATES PATENT AND TRADEMARK OFFICE
CERTIFICATE OF CORRECTION

PATENT NO. : 5,523,046
DATED : June 4, 1996
INVENTOR(S) : Weder et al.

It is certified that error appears in the above-identified patent and that said Letters Patent is hereby corrected as shown below:

Column 7, line 18, after "plurality" insert --of--.

Column 7, line 61, after "of" please delete "the".

Column 8, line 1, after "returned" please insert --to--.

Column 8, line 35, please delete "opening 10B" and substitute therefor --the opening 16--.

Column 8, lines 51-52, please delete "FIG. 18" and substitute therefor --FIG. 19--.

Column 10, line 33, please delete "segments 44B" and substitute therefor --segments 34B--.

Column 10, lines 34-35, please delete "segments 44B" and substitute therefor --segments 34B--.

Column 10, line 62, after "position" please insert --.--.

Column 10, lines 64-65, please delete "flower pot cover 10" and substitute therefor --flower pot cover 10B--.

Column 11, line 9, please delete "fins 10C" and substitute therefor --fins 18C--.

Column 12, line 67, please delete "outer frame 208" and substitute therefor --outer frame 206--.

Column 13, line 6, please delete "outer frame 208" and substitute therefor --outer frame 206--.

UNITED STATES PATENT AND TRADEMARK OFFICE
CERTIFICATE OF CORRECTION

PATENT NO. : 5,523,046
DATED : June 4, 1996
INVENTOR(S) : Weder et al.

It is certified that error appears in the above-identified patent and that said Letters Patent is hereby corrected as shown below:

Column 13, line 25, please delete "outer frame 208" and substitute therefor --outer frame 206--.

Column 15, line 5, before "slide" please delete "plates".

Column 15, line 29, after "between" please delete "in".

Column 15, lines 62-63, please delete "male tool 310" and substitute therefor --male tool 312--.

Column 16, line 4, please delete "bearing sleeve 326" and substitute therefor --bearing sleeve 336--.

Column 16, line 10, please delete "male tool 310" and substitute therefor --male tool 312--.

Column 16, line 24, please delete "male tool 310" and substitute therefor --male tool 312--.

UNITED STATES PATENT AND TRADEMARK OFFICE
CERTIFICATE OF CORRECTION

PATENT NO. : 5,523,046
DATED : June 4, 1996
INVENTOR(S) : Weder et al

It is certified that error appears in the above-indentified patent and that said Letters Patent is hereby corrected as shown below:

Column 16, lines 27-28, please delete "male tool 310" and substitute therefor --male tool 312--.

Column 16, lines 37-38, please delete "link arm 362" and substitute therefor --link arm 354--.

Column 16, line 43, please delete "male tool 310" and substitute therefor --male tool 312--.

Column 17, lines 4-5, please delete "second cam-hole 382" and substitute therefor --second cam-hole 380--.

Signed and Sealed this

Fifteenth Day of October, 1996

Attest:

BRUCE LEHMAN

Attesting Officer     Commissioner of Patents and Trademarks